US012764545B2

(12) United States Patent
Cardona

(10) Patent No.: US 12,764,545 B2
(45) Date of Patent: Oct. 13, 2026

(54) SMART DEVICE ACCESS CONTROLLER AND METHODS

(71) Applicant: State Farm Mutual Automobile Insurance Company, Bloomington, IL (US)

(72) Inventor: Alexander Cardona, Gilbert, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 117 days.

(21) Appl. No.: 18/407,175

(22) Filed: Jan. 8, 2024

(65) Prior Publication Data

US 2025/0048111 A1 Feb. 6, 2025

Related U.S. Application Data

(60) Provisional application No. 63/517,018, filed on Aug. 1, 2023.

(51) Int. Cl.
*H04L 9/00* (2022.01)
*H04W 12/08* (2021.01)
*H04W 12/64* (2021.01)

(52) U.S. Cl.
CPC ........... *H04W 12/64* (2021.01); *H04W 12/08* (2013.01)

(58) Field of Classification Search
CPC .............................. H04W 12/08; H04W 12/64
USPC .............................................................. 726/4
See application file for complete search history.

(56) References Cited

U.S. PATENT DOCUMENTS

| | | | |
|---|---|---|---|
| 7,289,965 | B1 | 10/2007 | Bradley et al. |
| 7,835,919 | B1 | 11/2010 | Bradley et al. |
| 7,966,203 | B1 | 6/2011 | Pietrzak |
| 7,974,854 | B1 | 7/2011 | Bradley et al. |
| 8,010,377 | B1 | 8/2011 | Bradley et al. |

(Continued)

FOREIGN PATENT DOCUMENTS

| | | | |
|---|---|---|---|
| AU | 2015100551 | A4 | 5/2015 |
| WO | 2018052595 | A1 | 3/2018 |

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

(Continued)

*Primary Examiner* — Josnel Jeudy
(74) *Attorney, Agent, or Firm* — Armstrong Teasdale LLP

(57) ABSTRACT

A computer system for controlling and provisioning access to a smart device associated with a property includes a plurality of connected smart devices physically located within or near the property and communicatively coupled to a local communication network and a remote system server configured to communicate with the connected smart devices via an external communication network. The remote system server includes one or more processors programmed to identify the connected smart devices within or near the property and a respective device definition for each connected smart device, generate a host environment for a host user, generate a guest environment for the guest user, and enable defined control of each connected smart device within the property by the guest user, according to the access parameters.

20 Claims, 12 Drawing Sheets

(56) References Cited

U.S. PATENT DOCUMENTS 8,027,850 B1 9/2011 Pietrzak
8,433,344 B1 4/2013 Virga
8,650,048 B1 2/2014 Hopkins, III et al.
8,655,595 B1 2/2014 Green et al.
8,682,682 B1 3/2014 Bradley et al.
8,712,805 B1 4/2014 Ferries et al.
8,760,285 B2 6/2014 Billman et al.
9,213,994 B2 12/2015 Green et al.
9,396,598 B2 * 7/2016 Daniel-Wayman ...... G07C 9/27
9,781,602 B1 * 10/2017 Girdhar ................. H04W 4/021
9,996,882 B1 6/2018 Manzella et al.
10,021,109 B2 * 7/2018 Zehler ..................... H04L 63/08
10,045,184 B2 * 8/2018 Padgett .............. G07C 9/00309
10,055,793 B1 8/2018 Call et al.
10,062,118 B1 8/2018 Bernstein et al.
10,102,589 B1 10/2018 Tofte et al.
10,198,771 B1 2/2019 Madigan et al.
10,223,751 B1 3/2019 Hutchinson et al.
10,229,394 B1 3/2019 Davis et al.
10,296,978 B1 5/2019 Corder et al.
10,383,170 B2 * 8/2019 Deros .................. H01R 31/065
10,387,966 B1 8/2019 Shah et al.
10,453,149 B1 10/2019 Gaudin et al.
10,510,120 B1 12/2019 Roll
10,572,947 B1 2/2020 Berends et al.
10,623,509 B2 4/2020 Delinselle et al.
10,664,922 B1 5/2020 Madigan et al.
10,672,081 B1 6/2020 Lyons et al.
10,699,346 B1 6/2020 Corder et al.
10,861,115 B1 12/2020 Stricker et al.
10,930,141 B2 2/2021 De Paz Alberola et al.
10,943,072 B1 * 3/2021 Jaganmohan .......... G06N 5/041
10,943,306 B1 3/2021 Gaudin et al.
10,949,928 B1 3/2021 Roll
11,003,334 B1 5/2021 Conway et al.
11,037,255 B1 6/2021 Ganev et al.
11,049,189 B2 6/2021 Shah et al.
11,055,797 B1 7/2021 Carone
11,087,347 B1 8/2021 De Guia et al.
11,087,420 B1 8/2021 Trundle
11,100,594 B1 8/2021 West et al.
11,151,654 B2 10/2021 Trainor et al.
11,210,741 B1 12/2021 Allen et al.
11,232,873 B1 1/2022 Aspro et al.
11,308,247 B2 4/2022 McDade
11,501,100 B1 11/2022 Geng et al.
11,546,413 B2 * 1/2023 Devta ..................... G06F 9/541
11,556,995 B1 1/2023 Little et al.
11,656,097 B2 5/2023 Vega et al.
11,715,074 B2 8/2023 Aspro et al.
11,748,817 B2 9/2023 Szott
11,783,423 B1 10/2023 Yager et al.
11,941,712 B2 3/2024 Trundle
2007/0088507 A1 4/2007 Haberlen et al.
2007/0260401 A1 11/2007 Sydor et al.
2008/0255862 A1 10/2008 Bailey et al.
2009/0177500 A1 7/2009 Swahn
2011/0047086 A1 2/2011 Heisterkamp et al.
2011/0270773 A1 11/2011 Siekman et al.
2011/0295624 A1 12/2011 Chapin et al.
2012/0072239 A1 3/2012 Gibbard et al.
2013/0197807 A1 8/2013 Du et al.
2013/0275263 A1 10/2013 Carlin, Jr. et al.
2014/0136242 A1 5/2014 Weekes et al.
2014/0358592 A1 12/2014 Wedig et al.
2015/0019262 A1 1/2015 Du et al.
2015/0061859 A1 3/2015 Matsuoka et al.
2015/0302529 A1 10/2015 Jagannathan
2016/0048934 A1 2/2016 Gross
2016/0055594 A1 2/2016 Emison et al.
2016/0055595 A1 2/2016 Green et al.
2016/0275633 A1 9/2016 Gitt et al.
2016/0321587 A1 11/2016 Gitt et al.
2017/0193720 A1 * 7/2017 Eyring ..................... G07C 9/38
2018/0033087 A1 2/2018 Delinselle et al.
2019/0251520 A1 8/2019 Bentley, III et al.
2020/0159387 A1 * 5/2020 Schoenfelder ......... G06V 20/20
2021/0011448 A1 1/2021 Coleman et al.
2021/0018335 A1 1/2021 Hood
2021/0019847 A1 1/2021 Sneed
2021/0090188 A1 3/2021 Lai et al.
2021/0090300 A1 3/2021 Leppänen et al.
2021/0150651 A1 5/2021 Shoup
2021/0182986 A1 6/2021 Butler et al.
2021/0279791 A1 9/2021 Jacoby
2021/0350471 A1 11/2021 Hakimi-Boushehri et al.
2022/0012999 A1 1/2022 Marotta et al.
2022/0013222 A1 1/2022 Marotta et al.
2022/0021684 A1 * 1/2022 Mensah ................ H04L 63/105
2022/0070014 A1 * 3/2022 Schwartz ................. G07C 9/20
2022/0343443 A1 10/2022 Graham et al.
2022/0391794 A1 12/2022 Singh et al.
2022/0405856 A1 12/2022 Hedges et al.
2023/0023808 A1 1/2023 Wall et al.
2023/0035517 A1 2/2023 Alfred et al.
2023/0153916 A1 5/2023 Little et al.
2023/0342732 A1 10/2023 Aspro et al.
2023/0342857 A1 10/2023 Gibson et al.
2023/0342858 A1 10/2023 Gibson et al.
2023/0342859 A1 10/2023 Gibson et al.
2023/0342862 A1 10/2023 Gibson et al.
2023/0342867 A1 10/2023 Gibson et al.
2023/0342868 A1 10/2023 Gibson et al.
2023/0342869 A1 10/2023 Gibson et al.
2023/0377070 A1 11/2023 Gibson et al.
2024/0037680 A1 2/2024 Gibson et al.
2024/0046366 A1 2/2024 Yager et al.
2024/0087290 A1 3/2024 Hedges et al.

OTHER PUBLICATIONS

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

SMART DEVICE ACCESS CONTROLLER AND METHODS

CROSS-REFERENCE TO RELATED APPLICATIONS

This application claims the benefit of priority of U.S. Provisional Patent Application Ser. No. 63/517,018, filed Aug. 1, 2023, and entitled "DEVICE ACCESS MANAGEMENT SYSTEM," the contents and disclosures of which are hereby incorporated in their entirety.

FIELD OF THE DISCLOSURE

The field of the disclosure relates generally to a smart device access controller and methods, and more specifically, to a networked computing ecosystem that enables host users to control and provision access to smart devices and property to guest users.

BACKGROUND

With the proliferation of the "internet of things" (IOT), more household devices and items are gaining communication and network connectivity capabilities. These devices are sometimes referred to as smart devices. The new capabilities of these devices enable easier data detection and more accurate information and metrics.

The home-sharing market is also expanding rapidly. With services like AIR BNB® and VACATION RENTALS BY OWNER (VRBO)®, among others, property owners and/or managers—hereinafter "hosts"—are increasingly offering their properties, or portions thereof, for use under short-term leases (e.g., days, weeks, months).

The use of smart devices in such rental properties may present clear benefits, in that property hosts have some level of remote access to the devices and that such devices often may have advanced features that are desirable for guests. However, these devices may have to be controlled separately, and varying products across brands may have different features or control schemes that are unfamiliar to guests. Moreover, various features of the devices may be accessed wirelessly, and hosts may not always be able to tell whether guests do or do not have connections to the smart devices.

What is needed is a system that enables host users to control and provision access to these devices and properties according to various access parameters determined by the host user, such that access by guest users may be restricted, while enhancing the experience of such restricted access by the guest users. Conventional techniques may have additional drawbacks, ineffectiveness, inefficiencies, and encumbrances as well.

BRIEF SUMMARY

The present embodiments may relate to, inter alia, systems and methods for controlling, provisioning, and restricting access to properties and devices by a host user. The system may include a centralized control server or controller, a marketplace server, one or more smart devices installed within one or more properties, and networked user computing devices including at least one host device and at least one guest device. The control server may be configured to transmit control signals to and receive usage data from the one or more smart devices, on behalf of the host device and based upon networked connection with the smart devices and/or the guest device(s).

In one aspect, a computer system for managing access to a property may be provided. The computer system may include one or more local or remote processors, servers, transceivers, sensors, memory units, mobile devices, wearables, smart watches, smart contact lenses, smart glasses, augmented reality (AR) glasses, virtual reality (VR) headsets, mixed or extended reality (XR) glasses or headsets, voice bots, chatbots, ChatGPT or ChatGPT-based bots, and/or other electronic or electrical components, which may be in wired or wireless communication with one another. For example, in one instance, the computer system may include a plurality of connected home devices physically located within or near the property and communicatively coupled to a home communication network and a remote system server configured to communicate with the connected home devices via an external communication network. The remote system server may include one or more processors programmed to (1) identify the connected home devices within or near the property and a respective device definition for each connected home device, wherein the device definition represents functionality of the corresponding connected home device; (2) generate a host environment for a host user, wherein the host environment includes a plurality of interactive user interfaces facilitating user input by the host users of access parameters limiting or defining access to each connected home devices within the property for a duration of stay at the property by a guest user; (3) generate a guest environment for the guest user wherein the guest environment includes a plurality of limited interactive user interfaces facilitating (i) display, to the guest user, of the access parameters of each connected home device, and (ii) limited control of each connected home device according to the access parameters, for the duration of the stay at the property; and (4) limit control of each connected home device within the property by the guest user, according to the access parameters. The computer system may include additional, less, or alternate functionality, including that discussed elsewhere herein.

In another aspect, a computer system for controlling and provisioning access to a smart device associated with a property is provided. The computer system includes a plurality of connected smart devices physically located within or near the property and communicatively coupled to a local communication network, and a remote system server configured to communicate with the connected smart devices via an external communication network. The remote system server includes one or more processors programmed to: (1) identify the connected smart devices within or near the property and a respective device definition for each connected smart device, the device definition representing functionality of the corresponding connected smart device, (2) generate a host environment for a host user, the host environment including a plurality of interactive user interfaces facilitating user input by the host user of access parameters limiting or defining access to each connected smart device within or near the property for a duration of stay at the property by a guest user, (3) generate a guest environment for the guest user, the guest environment including a plurality of interactive user interfaces facilitating (i) display, to the guest user, of the access parameters of each connected smart device and (ii) defined control of each connected smart device according to the access parameters, for the duration of the stay at the property, and/or (4) enable defined control of each connected smart device within or near the property by the guest user according to the access parameters. The computer system may have additional, less, or alternate functionality, including that discussed elsewhere herein.

In yet another aspect, a computer-implemented method for controlling and provisioning access to a smart device associated with a property is provided. The property may include a plurality of connected smart devices physically located within or near the property and communicatively coupled to a local communication network. The method is implemented using a remote system server configured to communicate with the connected smart devices via an external communication network, the method including: (1) identifying the connected smart devices within or near the property and a respective device definition for each connected smart device, the device definition representing functionality of the corresponding connected smart device, (2) generating a host environment for a host user, the host environment including a plurality of interactive user interfaces facilitating user input by the host user of access parameters limiting or defining access to each connected smart device within or near the property for a duration of stay at the property by a guest user, (3) generating a guest environment for the guest user, the guest environment including a plurality of interactive user interfaces facilitating (i) display, to the guest user, of the access parameters of each connected smart device and (ii) defined control of each connected smart device according to the access parameters, for the duration of the stay at the property, and/or (4) enabling defined control of each connected smart device within or near the property by the guest user, according to the access parameters. The method may have additional, fewer, or alternate actions, including those discussed elsewhere herein.

In still another aspect, a non-transitory computer readable medium having computer-executable instructions embodied thereon for controlling and provisioning access to a smart device associated with a property is provided. The property may include a plurality of connected smart devices physically located within or near the property and communicatively coupled to a local communication network. When executed by at least one processor of a remote system server configured to communicate with the connected smart devices via an external communication network, the computer-executable instructions cause the at least one processor to: (1) identify the connected smart devices within or near the property and a respective device definition for each connected smart device, the device definition representing functionality of the corresponding connected smart device, (2) generate a host environment for a host user, the host environment including a plurality of interactive user interfaces facilitating user input by the host user of access parameters limiting or defining access to each connected smart device within or near the property for a duration of stay at the property by a guest user, (3) generate a guest environment for the guest user, the guest environment including a plurality of interactive user interfaces facilitating (i) display, to the guest user, of the access parameters of each connected smart device and (ii) defined control of each connected smart device according to the access parameters, for the duration of the stay at the property, and/or (4) enable defined control of each connected smart device within or near the property by the guest user according to the access parameters. The computer-readable medium may have instructions that direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
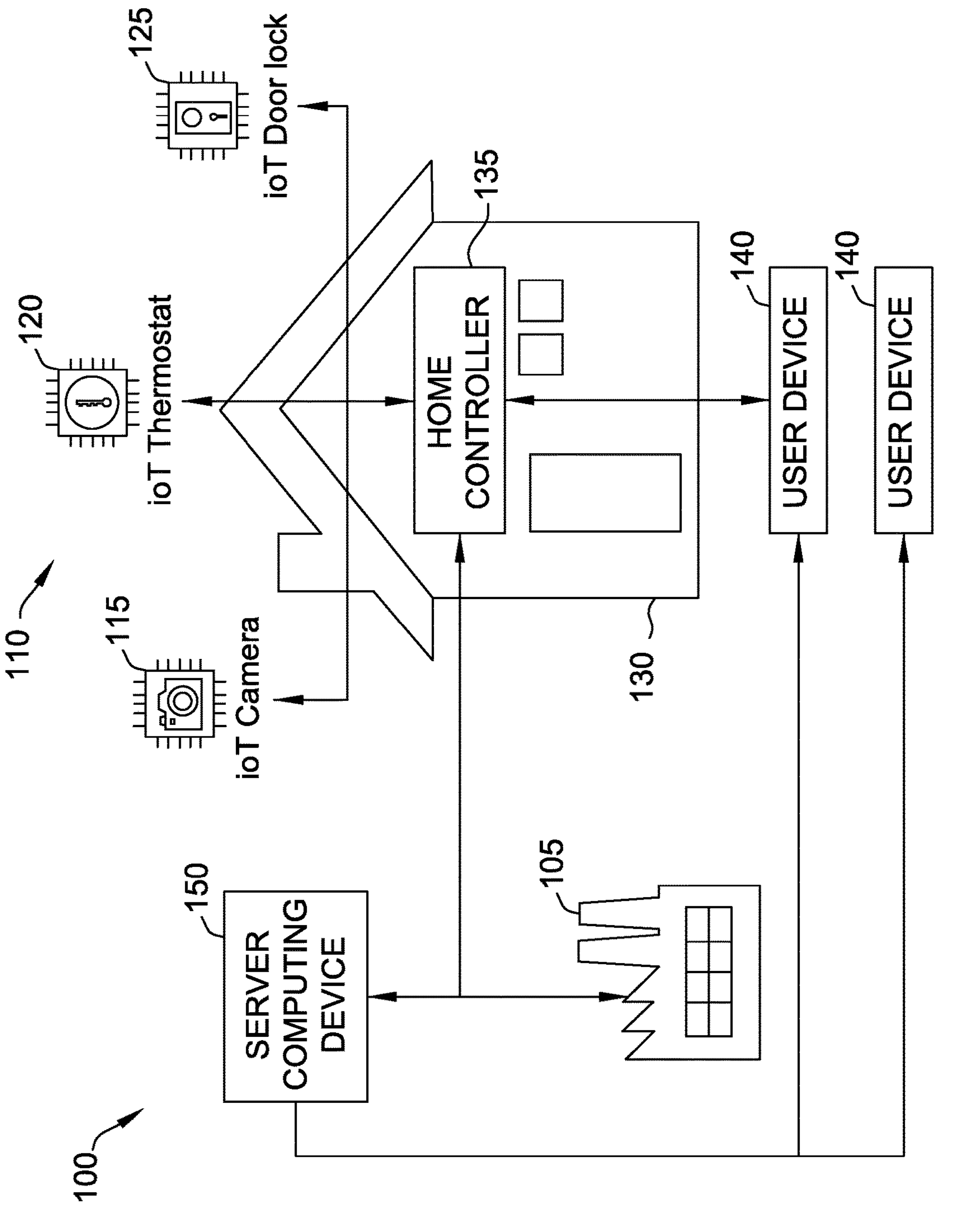
FIG. 1 illustrates an exemplary computer system for controlling and provisioning access to smart devices and properties, in accordance with the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for maintaining a device and property access control system and an associated software platform, where such a system and platform enable a host user to control and provision access to properties/smart devices to one or more guest users. The system may include a centralized control server, a marketplace server, one or more connected smart devices installed within or near one or more properties, and networked user computing devices including at least one host device and at least one guest device. The control server may be configured to transmit control signals to and receive usage data from the one or more connected smart devices, on behalf of the host device and based upon networked connection with the connected smart devices and/or the guest device(s).

As used herein, a property may include any property made available for rental by a property owner or manager, collectively a property host. Such a property may include residential properties, such as homes, townhomes, condos, apartments, guest houses, accessory dwelling units (ADUs), mobile or movable homes (e.g., campers, so-called tiny houses, etc.), off-grid housing structures (e.g., houseboats, yurts, etc.), or any portions thereof (e.g., a suite or room within such a property). Such a property many include commercial or industrial property, in some embodiments.

In the exemplary embodiment, each property has a plurality of connected home devices (also referred to as smart devices, "Internet of Things" (IOT) devices, smart home devices, connected devices, etc.) physically located within or nearby the property. Connected smart devices include, for example only and not limited by, thermostats, door locks, window locks, security systems, cameras, doorbells, light fixtures, televisions, appliances (refrigerators, stoves/ovens), pools, spas or hot tubs, showers, bathtubs, audio systems (speakers, microphones, etc.), smart assistants and associated devices (e.g., ALEXA devices, GOOGLE HOME devices, CORTANA devices, etc.), garage door openers, standalone heating devices (e.g., fireplaces), solar energy systems, and the like. The term "smart," as used herein, may generally refer to the ability of the device to be remotely controlled by another device or by a person and to send/receive data and control signals over a network (e.g., BLUETOOTH, the internet, NFC, etc.). In some instances, a subset of the plurality of connected smart devices physically located at or near a property may be in networked communication with a hub device or home controller that is also physically located at the property, and which can be used to control the devices within the subset. In other instances, there may be no hub or home controller within a property, and the connected smart devices are independently controlled. Notably, the home controller itself may be considered a connected smart device within the scope of the present disclosure.

Additionally or alternatively, connected smart devices may include any network devices that communicatively connect one or more smart devices to each other and/or to another communication network such as the internet. For instance, a wireless network router may be a connected smart device and may also serve to connect other smart devices to one or more communication networks.

Additionally or alternatively, a user, such as a homeowner or home renter, may access or otherwise communicate with the various connected smart devices, home Wi-FI, home server or computers, and other network devices via various means. For instance, the user may use one or more local or remote processors, servers, transceivers, sensors, memory units, mobile devices, wearables, smart watches, smart contact lenses, smart glasses, augmented reality (AR) glasses, virtual reality (VR) headsets, mixed or extended reality (XR) glasses or headsets, voice bots, chatbots, ChatGPT or ChatGPT-based bots, and/or other electronic or electrical components, which may be in wired or wireless communication with one another, to communicate and/or otherwise interact with the various connected smart devices, or use manual, physical, or direct interaction (such as by touch or voice interaction).

In the exemplary embodiment, the system may retrieve data relating to the connected smart devices located at (e.g., within or near) each property within the host's property portfolio. In some embodiments, the system may prompt the host to submit a list of currently-installed connected smart devices, for example, as a fillable form, a voice prompt, and/or a text prompt, and/or may receive a natural language query from the host including currently-installed connected smart devices. Additionally or alternatively, the system may autonomously retrieve data relating to the connected devices currently installed within or near a property. For example, the system may communicate with a local home controller or network device (e.g., an internet router) that communicates with each of the connected smart devices in the property, and retrieve information about the connected smart devices via the home controller.

The system may also collect data about different attributes of the property via the connected smart devices, such as, but not limited to, the presence of one or more people, power usage, water usage, current temperatures, doors and/or windows open/closed and/or locked/unlocked, as well as current and future weather conditions and other parameters that may affect the property. The host user may provide the system with access to data from the connected smart devices. These devices may provide their data directly and/or provide data through servers associated with and in communication with the connected smart devices.

Once the connected smart devices are identified, the system receives or retrieves access credentials associated with the connected smart devices. These access credentials may be shared between devices or may be unique to each individual device. For example, in some instances, the access credentials may be the network ID and password for a network router that connects other smart devices to the internet (e.g., to a local communication network), and accessing that network enables access to one or more other smart devices. In other instances, access to a connected smart device requires additional or alternative access credentials. The host may input access credentials and/or provide permission for the system to retrieve access credentials.

The system may receive and/or retrieve respective device definitions associated with each device. These device definitions represent the various functions available at/by each connected smart device. For example, a television may have a device definition including an on/off function, a channel function, a volume function, and an input/source selection function, whereas a connected lighting device may have an on/off function only, or may also have a dimming function, color-change function, and/or timer function.

The system organizes the device definitions for display within an interface of a host environment on a software platform, which the host user can access via their host computing device (e.g., a smart phone, laptop computing device, tablet, etc.). The system also provides the host user with access parameters for each element of the respective device definitions. The access parameters define the boundaries of access to the corresponding device that a guest user may have during a stay at the property, and are set by the host user within the host environment. The access parameters may include a "universal" access parameter that can be set by the host user to entirely restrict access to that device. For instance, in the case of a controllable fireplace, the host user may set the universal access parameter to completely restrict usage of the fireplace such that the guest user may not turn on or otherwise operate the fireplace.

Other access parameters may be set to define or limit access to a device for a specific period of time (e.g., only for the duration of the guest user's stay) or by a certain device or number of devices. Access parameters may also be set to define or limit access to certain features. For example, the host user may set the access parameters for a smart thermostat such that the guest user can change the temperature within a defined or limited range.

In this way, the host user can provision customized access to the property and the smart devices therein, on a per-guest or per-stay basis. This capability may enhance the safety of a property, by limiting access to a door lock or network device only to a specific time and/or to a specific guest device(s). The host user may also be able to customize access to a guest user based upon certain rates or features agreed to; for instance, a second bedroom or a rec room may remain locked for guests paying a lower rate, and may be unlocked for guests paying a premium rate.

The host environment enables the host user this level of customization across multiple properties and across a calendar of scheduled stays. The host user may set access parameters on a per-property basis, such that a default access profile exists for each property. The host user may change any access parameter(s) on a per-stay basis, if applicable. In some embodiments, the system may generate, identify, or recommend the default access profile for a property, after learning the host user's preferences over a threshold number of preliminary stays.

As described further herein, where the system learns the preferences of a guest user, the system may prompt the host user to change one or more access parameters from the default access profile, for the stay associated with that guest user. The system may also prompt the host user to change access parameters in response to trends in guest user preferences within a geographic region, for example.

The host user may also control the access parameters based upon whether the property is occupied or unoccupied. For example, the host user may restrict access to a smart thermometer and set the temperature at some idle temperature when there is no recorded stay taking place at the property. The host user may change access credentials of one or more devices when a property is unoccupied and/or between stays, such as a code for a smart lock on an entry door of the property.

In addition to the customization of access to the property and devices, the host environment also enables the host user to input content associated with the connected smart devices and their functions, for subsequent use by the guest user(s). The host user may input text content, audio content, image content, video content, and the like, related to each connected smart device. The content may be instructional or educational content to advise the guest user about the function(s) of the device, risks or warnings about operation of the device, indications about the access limitations of the device, and the like.

The host user may select or input one or more instructions regarding the display of the content to the guest user. For example, the host user may define whether any content is automatically provided to the guest user based upon some other action or condition, where/how to display or otherwise provide a link to the content, who can access the content, and the like. The system may also enable the host user to input property-level content, or content not associated with any one connected smart device. This property-level content may include recommendations, "house rules," "house preferences," "house baseline functionality," and the like.

In some embodiments, the system is configured to receive and/or retrieve market details associated with each connected smart device and, in some instances, with one or more other objects or features within the home. The market details may include a brand, price, location of purchase, etc. The host user may provide the market details and/or may select which connected smart devices and/or objects for which to provide or retrieve the market details. Based upon a designation of the object, which the system may receive as user input from the host user or that the system may determine based upon the device definition, the system may retrieve market details for a device or object from an external source (e.g., the internet). In some cases, the host user may capture an image or video of a device or object, and the system may be configured to perform one or more image processing or object recognition processes on the image or video of a connected smart device or object within or near the home, to retrieve market details from an external source (e.g., the internet).

The host environment may also enable the host user to set preferences for receiving notifications or alerts related to the property and/or to certain connected smart devices. For example, the host user may set a preference that they receive an alert when the property is first accessed at the beginning of a stay. As another example, the host user may set a preference to receive an alert when a smoke detector or carbon monoxide detector is activated, or when a water sensor in a basement indicates the presence of water (e.g., in the event the basement floods).

In the exemplary embodiment, one or more guest users may "book a stay" or request a short-term rental at a property using a property-sharing platform. The system may maintain the property-sharing platform, may be associated therewith, or may be completely separate from the property-sharing platform and receive data from the platform over an API or other connection. The details of the stay may be defined and stored within a rental record. For example, the rental record includes an indication of a number of guests, a start date and end date of the short-term rental (and, therefore, a duration of the rental), and a shared space identifier (e.g., "shared room," "private room," "whole property," "shared space," "shared kitchen," "shared family area," etc.) identifying which space(s) of the property are to be shared with the guest user(s) during the short-term rental.

The host user may instruct the system to provision the access—as defined by the set access parameters—to a guest user for the duration of their stay. This process may be manually initiated by the host user, for example, within a period of time preceding a scheduled stay. Additionally or alternatively, the system may be configured to automatically initiate access provisioning based upon the rental record of a scheduled stay.

In one exemplary embodiment, to provision access to the property, the system transmits an invitation message to a user device of the guest user. The invitation message, once accessed by the guest user, causes display of a link to an alternative environment of the software platform, referred to herein as the guest environment. The link may be a hyperlink, a selectable icon, or any other selectable feature. Additionally, the link includes one or more parameters or data elements that, upon selection of the link by the guest user, the link causes display of the guest environment to the guest user.

In some instances, selection of the link causes the user device to execute a web browser to display a landing webpage, or to execute a separate software application ("app") that hosts the guest environment. The webpage or app may be associated with the system itself or may be an add-in to an existing webpage or app, such as a webpage or app associated with a property sharing service (e.g., AIRBNB, VRBO, etc.).

The guest environment may be much more limited in scope than the host environment, based upon the access parameters set by the host user. In the exemplary embodiment, even the access to the guest environment is limited based upon the access parameters, such as based upon a duration of the guest user's stay in the property or a guest user's proximity to the property. For example, the host user may instruct the system to transmit the link to the guest environment within a defined time period preceding a guest user's stay, or when the user device of the guest user is within a threshold distance to the property (e.g., within a threshold number of miles).

The guest environment, when accessed by the guest user, displays selectable options associated with the connected smart devices within the property in which the guest is staying. The selectable options are defined or limited according to the access parameters set by the host user. For example, if a host user has defined or limited the temperature range of a spa or hot tub, or has restricted use of the spa entirely, the guest environment may only provide selectable options that enable the guest user access to the spa or hot tub within the access parameters.

In one exemplary embodiment, an initial display state of the guest environment is related to the default access profile for the property at which the guest user is staying. For example, where a default or initial state of the temperature has been set to X degrees, the access credential for a door lock to an entry has been set to 1234, and the state of a foyer light has been set to "On:Dim", the guest environment may display the initial state of these connected smart devices. In some instances, a host user may restrict the guest user from changing any aspect of the default access profile before the guest user arrives at the property and/or before the stay commences. In other instances, some or all settings may be changed—within the scope of the set access parameters—within some threshold period of time preceding a stay or when the guest user is within some threshold distance of the property.

The customized guest environment, which is associated with a particular guest user for a particular stay at a particular property, may also be accessible only to particular user devices or under certain conditions. In some instances, the system may associate a customized guest user environment with a phone number or device ID of a guest device, and only that guest device may access the link and/or the guest user environment.

In other instances, the access is limited to user devices within a threshold distance of the property or connected to a network associated with the property. For example, the guest device may only be able to access the guest environment when connected to the Wi-Fi at a property.

In some cases, only certain features or connected smart devices may have such defined or limited access. For example, the guest environment may only have access to selectable options that control features of a smart oven when their user device is connected to the Wi-Fi at the property, preventing inadvertent operation of the smart oven when the guest user is not at the property.

In some embodiments, the guest environment may enable the guest to connect their personal profile to one or more connected smart devices during the duration of their stay. For example, the guest user may be able to connect their profile for a particular video streaming service to a television within the property. Or the guest user may be able to connect their profile to a music streaming service to a smart speaker within the property. In some cases, the guest environment provides a selectable option associated with the property and/or the device(s) that can be connected to the personal profile of the guest user. For example, there may be an icon that displays the text "Sign Me In." Upon selection of the icon, the guest user may be prompted through a series of commands or webpages that facilitate a connection with the guest user's personal profile (e.g., via an API connection, a Matter Protocol connection, etc.). In some embodiments, a guest user may pre-load information associated with their personal profile(s) into the guest environment, such that when the guest user arrives at the property or selects a "sign in" command, the system uses the preloaded information to log into and/or connect to the guest user's personal profile(s) without any further action or input by the guest user. Advantageously, the system may be configured to automatically disconnect any personal profiles from the connected smart device(s) associated with a property, at the end of a guest user's scheduled stay.

The selectable options within the guest environment may also include or be related to the content associated with the connected smart devices. The guest user may selectively and manually access the content as desired. For example, a guest user may access instructional content associated with a smart thermometer when the guest user wishes to learn how to change or set a temperature. As described above, the instructional content may be text-based, video-based, etc.

Additionally, some content may be automatically displayed based upon certain conditions. For example, an introductory or welcome video may auto-play on the user device of the guest user after the guest user operates a smart lock on an entry to the property. The content may also be accessible via a "help" function within the guest environment. The system may be configured to initiate an AI-based chat session in response to the selection of the help function. The system may interpret a query input by the guest user and process the content associated with the connected smart devices (and/or other objects) at the property to provide a response to the user's query.

In some embodiments, the guest user may interact with the user interface of the guest environment to select an augmented reality (AR) feature (or virtual reality (VR) feature) associated with the property. This feature may enable the guest user to capture live video of the property, specifically of one or more connected smart devices. The system receives a stream of the live video and performs one or more object recognition processes and/or device recognition processes (e.g., to detect a heading, orientation, position, location, etc., of the device) to determine which connected smart device is featured in the stream of the live video. The system may transmit content to the user device and/or may cause display of content on the user device, as an augmented reality overlay upon the live video displayed on the user device.

The AR overlay may include a link to content associated with the connected smart device or may include the content itself. For example, when a guest user captures live video of a smart thermostat, the overlay may include an instructional video related to operation of the smart thermostat that is programmed to autoplay, or to play upon selection of a "play" command by the guest user. The system may additionally or alternatively display market details associated with that connected smart device. In some embodiments, the system displays, as part of the market details, a link to purchase a connected smart device, object, or service. In addition to or alternatively to the AR overlay, the instructional video may be presented on a VR headset or the like, or on a mobile device, such as a smart phone.

In some instances, the system may detect an object other than a connected smart device in the stream of the live video, where the object has content or market details associated therewith. As one example, the host user may have input instructional content associated with operation of a shower into the software platform. When a guest user captures live video of the shower during an augmented reality session, the system may initiate display of the instructional content as an overlay on the live video of the shower.

The system of the present disclosure is configured to coordinate a property ecosystem based upon the preferences of and/or commands from the host user. The system may be configured to derive unique insights related to the property ecosystem, and/or to host users and guest users interacting therewith, via artificial intelligence/machine learning (AI/ML). In one exemplary embodiment, the system executes an AI engine programmed to learn, without limitation, preferences of host users, preferences of guest users, behaviors of guest users, preference/behavior trends across guest users within a property, preference/behavior trends across guests users within all or a subset of properties within a property portfolio, preference/behavior trends across guests users within a geographic region including one or more properties, usage profiles associated with properties, operation profiles of connected smart devices within one or more properties, and product lifecycles or failure profiles of connected smart devices.

To facilitate this learning, the system includes one or more databases at which data collected from the connected smart devices is stored. The system may also collect data from the user device(s) of the host user and from the user device(s) of the guest users. In the exemplary embodiment, the system provides to each user one or more opt-in options, in which the user can permission the system to collect data associated with the user's interaction with the system and/or with the connected smart devices. The system may also communicate to the user(s) that usage data is being collected from the connected smart devices. Based upon the user's opt-in preferences, the usage data may be anonymized or only used in an aggregated fashion. This data becomes one or more input training sets for the AI engine, which ingests the input data to generate one or more machine-learned models that output trends, predictions, recommendations, and the like.

The system is configured to provide the host user with the model outputs in a dashboard interface within the host environment. The model outputs can be formatted as visual representations of trends, as text-based or natural language recommendations, as proposed adjustments to a default access profile for a property, and the like. Some examples of model outputs may include, without limitation, recommendations of access parameters on a per-guest or per-property basis; recommendations of connected smart devices, based upon which products have been used most often, have functioned better, or have better connectivity/functionality with guest user devices; and recommendations of content to input or update, based upon frequent guest queries.

In some embodiments, the system executes the AI engine to generate guest user profiles, as guest users perform two or more stays across one or more properties (which do not need to be in a single property portfolio). These guest user profiles reflect guest preferences, such as an ambient temperature, choice of music, preferred streaming profiles, and the like. The system may recommend, to a host user, a customized access profile for a property in advance of a guest user's stay, in which the access parameters are automatically selected or tuned to the guest user's preference, based upon the guest profile.

The system may also leverage the guest user profile to customize the guest environment for a guest user during a stay. For example, the system may customize the guest environment such that selectable options associated with a guest user's most frequently used connected smart devices are displayed first or in a more prominent display section. The system may push content, such as instructional videos or text, to the guest user when a connected smart device is a different brand, make, or model than any connected smart device the guest user has previously interacted with (while registered with the system as a guest user).

In some embodiments, the system is configured to identify a host language and a user language. The host language may be selected by the host user manually, or the system may automatically detect a language of the host user's device or the content input by the host user. Likewise, the guest language may be selected by the guest user manually, or the system may automatically detect a language of the guest user's device. Where the host language is different from the guest language, the system may be configured to automatically provide the guest environment in the guest language. The system may automatically translate content or other data elements that were input in the host language into the guest language before display of the content within the guest environment. Likewise, where the guest user inputs a query or reaches out to the host user, the system may automatically translate the query or message from the guest language to the host language, before displaying the query or message to the host user within the host environment.

In some embodiments, the system is associated with an insurer or is communicatively coupled to an insurer computing device. The insurer represents an entity that provides insurance products to users. In some such embodiments, the system is configured to leverage the AI engine to generate usage profiles associated with each property. The usage profiles reflect a level of usage of the property by guest users (e.g., 87% occupancy by one or more guest users over a period of time, such as a year) as well as more detailed aspects of the usage, based upon the data collected from the connected smart devices. For example, the usage profile may indicate levels of usage of each connected smart device, as well as any anomalous usage or usage outside of a threshold representing normal or expected usage.

The system may transmit the usage profile(s) to the insurer computing device for subsequent use in underwriting decision making, based upon a perceived risk level associated with the usage profile. Additionally or alternatively, the system may access historical insurance data (e.g., claims data) and compare one or more aspects of the usage profile to the historical data. Based upon such a comparison, the system may automatically generate a risk score or rating associated with the property. The risk rating may be sent to and/or accessed by the insurer computing device during an underwriting process.

In still further embodiments, the system may provide host and guest environments in contexts outside of a property sharing platform. Specifically, in some embodiments, the host user is a homeowner or real estate agent representing a homeowner, and the property is for sale. The guest users may be potential buyers of the property and/or real estate agents representing those sellers. The host and guest environments may otherwise have similar functionality as described herein, except the access parameters are set not for a "stay" by the guest user but for a walkthrough or open house attended by the guest user. Under these circumstances, the guest user (potential buyer) can have greater insight into the features of the home. Moreover, the system may enable a guest user to access the home outside of a scheduled open house, by providing access parameters associated with an entry lock or the like. As described above with respect to a "stay," the access parameters are revoked after the walk-through is complete or after a predetermined period of time (e.g., 20 minutes, 30 minutes, one hour, etc.).

Connected smart devices or home devices, as used herein, may refer generally to any device configured to collect data associated with a property and to transmit that collected data to a home controller and/or to the centralized control server. These devices may include, for example, sensors (e.g., thermometers, light sensors, motion sensors, proximity sensors, smoke detectors, carbon monoxide detectors, cameras, microphones, etc.), "Internet of Things" (IoT) connected devices (e.g., connected/programmable thermostats, lights, alarms, garage doors, appliances, etc.), meters (e.g., timers, utility meters, etc.), routers, modems, and/or any other such device. The devices may collect data such as date and time of use, function(s) used, power on/off, electricity consumption, connection status, and more. In the exemplary embodiment, a property may include (e.g., have physically present at, within, or near the property) one or more devices that enable communicative coupling between devices, for example, via the Internet or any other wired or wireless connection (e.g., BLUETOOTH®) over one or more radio links or wireless communication channels.

The methods and systems described herein may be implemented using computer programming or engineering techniques including computer software, firmware, hardware, or any combination or subset. As described above, at least one technical problem is that, with the growing popularity of home-sharing properties utilizing smart devices, while the smart devices may provide desired functionality to guests, guests may be unfamiliar with the features or control schemes of the smart devices associated with any given property. For example, there are many different models and types of devices available on the market, and a guest may be familiar with smart devices in general, but they may not be well versed in the specifics of the devices associated with a given short-term rental property. Further, the hosts of the property may wish to provide guests with certain functionality of the smart devices of the property, but not the full functionality. Hosts may also wish to ensure that guests only have permission to control or utilize the smart devices only throughout the duration of their stay.

The technical effect of the systems and processes described herein may be achieved by performing at least one of the following steps, with host user and/or guest user permission or affirmative consent: (1) identifying the connected smart devices within or near the property and a respective device definition for each connected smart device, the device definition representing functionality of the corresponding connected smart device; (2) generating a host environment for a host user, the host environment including a plurality of interactive user interfaces facilitating user input by the host users of access parameters limiting or defining access to each connected smart device within the property for a duration of stay at the property by a guest user; (3) generating a guest environment for the guest user, the guest environment including a plurality of interactive user interfaces facilitating (i) display, to the guest user, of the access parameters of each connected smart device and (ii) defined control of each connected smart device according to the access parameters, for the duration of the stay at the property; and/or (4) enabling defined control of each connected smart device within the property by the guest user, according to the access parameters.

The resulting technical effect is that the host user has the capability to selectively allow guest users functionality to selected features of smart home devices and limit or define control of the home devices to ensure that guests have access to the selected features, but only during the duration of the stay at the property. Further, the guest user benefits from a centralized interface which allows the guest user access to the defined (e.g., limited or restricted) functionality of the smart devices, as defined by the host user.

Exemplary System for Controlling and Provisioning Access to Properties and Connected Smart Devices FIG. 1 illustrates an exemplary system 100 for controlling access to properties and connected smart devices, in accordance with at least one embodiment of this disclosure. In the exemplary embodiment, a manufacturer 105 provides one or more internet connected devices 110, also known as Internet of Things (IoT) devices or connected smart devices 110. These devices 110 may be physically located in, near, or around a property 130. The devices 110 may include, but are not limited to IoT cameras 115, IoT thermostats 120, IoT door locks 125, and/or any other Internet connected device, such as a mobile device, including, but not limited to, a laptop and/or a mobile phone, one or more voice or chat bots, a computer device, a home controller 135, and/or any other connected smart home device and/or appliance. In at least one embodiment, the home controller 135 is in wired or wireless communication one or more of the connected smart devices 110 in the property 130. In some embodiments, the home controller 135 may be a router or Wi-Fi providing device in the property 130. Additionally or alternatively, the home controller 135 is a smart home controller that controls one or more of the devices 110 and may provide communication between a user and the individual devices 110, and/or between a centralized server (e.g., server computing device 150) and the devices 110.

In at least one embodiment, each device 110 collects data about the property 130 either directly or indirectly. For example, a smart light bulb may report when the bulb is on and off. This may indirectly indicate whether or not an individual is near the bulb. In the at least one embodiment, many devices 110 are in communication with one or more servers of the manufacturer 105. The manufacturer server 105 may provide additional services, such as remote activation. The manufacturer server 105 may also collect data observed by the device 110, including, but not limited to, usage data about the device 110.

User devices 140 may interact with the connected smart devices 110 and/or the home controller 135. User devices 140 may include user computing devices associated with and operated by users, such as a host user or a guest user. In the example embodiment, user devices 140 are computers that include a web browser or a software application, which enables user devices 140 to communicate with access control server 150 using the Internet, a local area network (LAN), or a wide area network (WAN). In some embodiments, user devices 140 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. User devices 140 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality)

headsets or glasses), chat bots, voice bots, ChatGPT bots or ChatGPT-based bots, or other web-based connectable equipment or mobile devices.

In some embodiments, an access control server 150 may be in communication with one or more of the connected smart devices 110, the home controller 135, user devices 140, and/or the manufacturer servers 105. The access control server 150 collects (e.g., receives and/or retrieves) data from the connected smart devices 110, the home controller 135, and/or user devices 140, and controls, provisions, and manages access to devices 110 according to access parameters set by a host user. Controlling access to devices 110 may include, but is not limited to, transmitting control signals to devices 110 to operate the devices 110, powering devices 110 on or off, and limiting, defining, or restricting functionality of devices 110.

In the exemplary embodiment, the access control server 150 may execute an AI engine, as described in further detail herein, that receives inputs including data from the connected smart devices 110 that are currently installed in or near the property 130, as well as data from user devices 140 (e.g., a host user device 140; a guest user device 140, while the guest user device 140 is present at property 130 or during a scheduled stay). In some embodiments, the AI engine may additionally receive third party data relating to other properties 130 within a geographic vicinity of the property 130. This received data may be used to train the AI model, to output recommendations, and generate responses to user queries, as described in further detail below.

Exemplary Home Monitoring System

Figure 2:
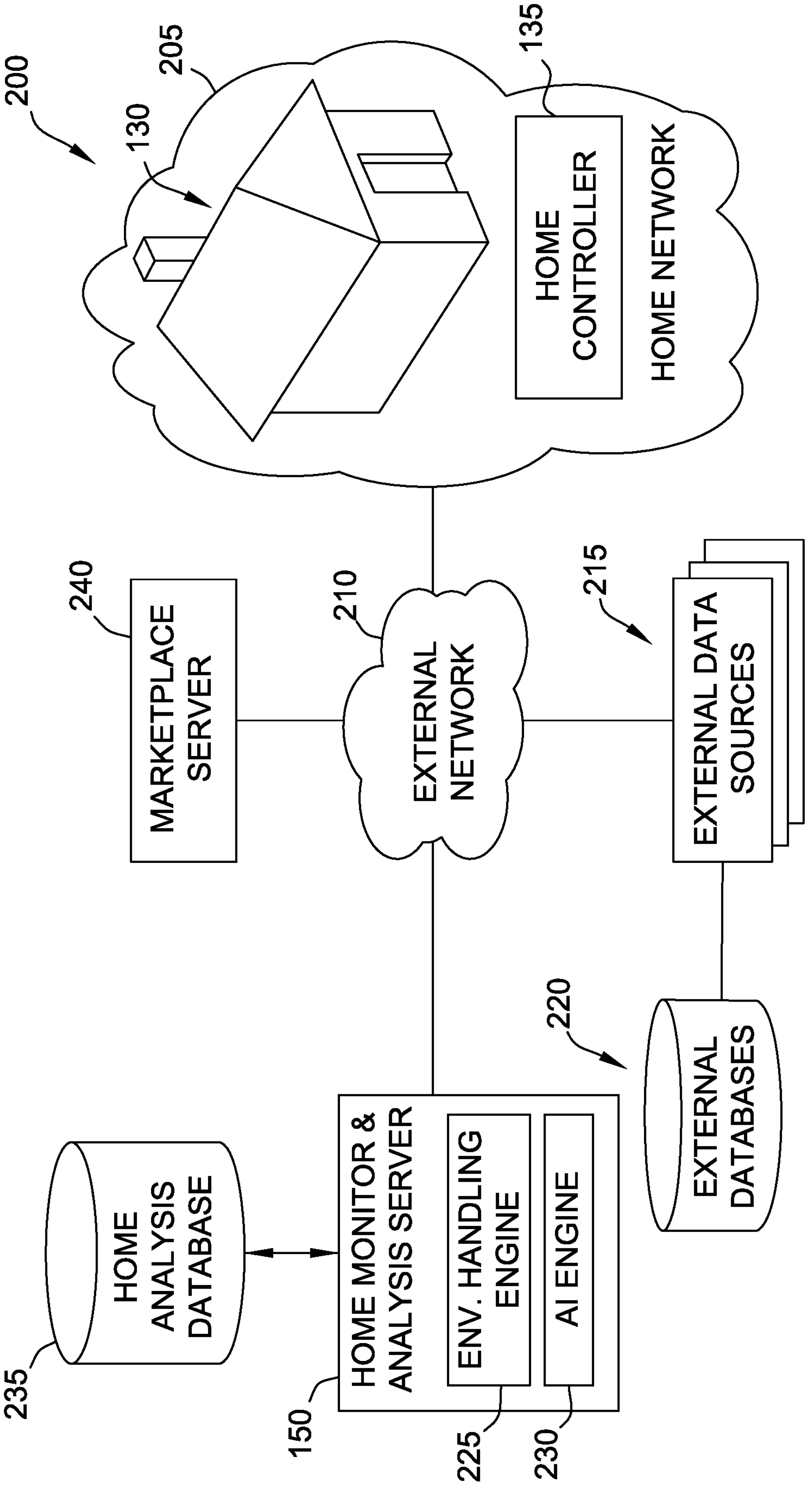
FIG. 2 illustrates an exemplary expanded access control system, including the system of FIG. 1, that may be used for facilitating the provisioning of property and device access, as well as maintaining host and guest computing environments.

FIG. 2 illustrates an expanded property and device access control (PDAC) system 200 that may be used for controlling and provisioning access to a property (e.g., property 130) and connected smart devices (e.g., devices 110) located in or near the property 130. In the exemplary embodiment, the PDAC system 200 includes the access control server 150 that may be remote from the property 130. The access control server 150 is configured to execute an environment handling engine 225 and an AI engine 230. The access control server 150 may include or otherwise be in communication with a database 235 that stores information about the property 130 and other properties within a host's property portfolio (and/or properties that are registered with the PDAC system 200 but that are not associated with a same host).

In the exemplary embodiment, the access control server 150 is in networked communication with the home controller (or just "controller") 135 of the property 130 through an external network 210 (e.g., the Internet). The home controller 135 may manage aspects of data collection, inter-device communication and control, and alerting as a part of the PDAC system 200. The home controller 135 is connected to a home network 205 of the property 130, also referred to herein as a local network 205, which allows communication with the access control server 150 through the external network 210. For example, the property 130 may include a local area network ("LAN"), a wireless network (e.g., Wi-Fi network), or some combination thereof that connects to the external network 210 (e.g., via a subscription service to an Internet service provider, or the like). In some embodiments, the home controller 135 may communicate via a wireless mobile network, such as a 3G, 4G, or 5G network.

The local network 205 may allow various devices within the property 130 to communicate over the local network 205, such as computing devices and connected smart devices 110 (as also shown in FIG. 1) (e.g., smart sensors, smart appliances, or the like). Some devices 110 may participate in the PDAC system 200, for example, providing device data that may be used (e.g., by the access control server 150) to provision and define access to devices 110 based upon set access parameters, or other uses described herein.

In the exemplary embodiment, the systems 100 and 200 may allow host users and guest users to opt into or out of various aspects of data collection from smart devices 110 and/or user devices 140 (e.g., by device type, by type of data collected, by data use). For example, a user may be presented with an individual login to the systems 100 and 200, which may include an opt-in screen that allows the user to view data collection and usage policy and select whether they wish to allow such usage, thereby protecting privacy of the user.

The access control server 150, in the exemplary embodiment, may collect some home data from one or more external data sources 215. The environment handling engine 225 and an AI engine 230 may, for example, collect data from publicly available sources or from private third-party sources about the particular subject property 130 or the area in which the property 130 is built. Such data from external data sources 215 is referred to herein as external data. Some external data sources 215 may maintain such external data in one or more external databases 220. Other examples of external data sources 215 and external data may be provided by manufacturers 105 (shown in FIG. 1) in addition to those provided below, as well as various uses for such external data.

In the exemplary embodiment, the access control server 150 is in communication with a marketplace server 240 through the external network 210. The marketplace server 240 is a platform where a user (e.g., a host user or guest user) may purchase devices or objects.

In some embodiments, the access control server 150 may be associated with or operated by an insurance provider that provides insurance coverage for the property 130 (e.g., via a home insurance policy) or that provides participation in systems 100 and 200 as a home protection service for a host user. The insurance provider may be any individual, group of individuals, company, corporation, or other type of entity that may issue insurance policies for customers, such as a homeowners, renters, or personal articles insurance policy associated with the property 130 or an insured. For example, after signing up for a home insurance coverage, the insurance provider may provide the home controller 135 for installation in the property 130. Although the present disclosure describes the systems and methods as being facilitated in part by an insurance provider, it should be appreciated that other non-insurance related entities may implement the systems and methods.

The home controller 135 may be configured to collect data from devices 110 (and/or user devices 140) within or around the property 130, connect to the local network 205, and communicate with the access control server 150 and/or marketplace server 240 for the various aspects of the access control and provisioning as described herein. The home controller 135 may be configured to connect to the local network 205 and communicate with other networked devices 110 within the property 130. In some embodiments, the access control server 150 may communicate directly some or all of the devices 110 within or around the property 130, without the home controller 135 as an intermediary. Various devices are illustrated in further detail below with respect to FIG. 3.

In the exemplary embodiment, access control server 150 provides a platform (e.g., using environment handling engine 225, shown in FIG. 2) that enables a host user to provision access to properties/devices (e.g., property 130, connected devices 110) to one or more guest users. Access control server 150 may be configured to transmit control signals to and receive usage data from the one or more connected smart devices 110, on behalf of the host user device 140 and based upon networked connection with the connected smart devices 110 and/or the guest user device(s) 140.

As used herein, property 130 may include any property made available for rental by a property owner or manager, collectively a property host. Such a property 130 may include residential properties, such as homes, townhomes, condos, apartments, guest houses, accessory dwelling units (ADUs), mobile or movable homes (e.g., campers, so-called tiny houses, etc.), off-grid housing structures (e.g., houseboats, yurts, etc.), or any portions thereof (e.g., a suite or room within such a property). Such a property 130 many include commercial or industrial property, in some embodiments.

In the exemplary embodiment, each property 130 has a plurality of connected smart devices 110 (also referred to as home devices, "Internet of Things" (IOT) devices, smart home devices, connected devices, etc.) physically located within and/or around the property. Connected smart devices 110 include, for example only and not limited by, thermostats, door locks, window locks, security systems, cameras, doorbells, light fixtures, televisions, appliances (refrigerators, stoves/ovens), pools, spas or hot tubs, showers, bathtubs, audio systems (speakers, microphones, etc.), smart assistants and associated devices (e.g., ALEXA devices, GOOGLE HOME devices, CORTANA devices, etc.), garage door openers, standalone heating devices (e.g., fireplaces), and the like. The term "smart," as used herein, may generally refer to the ability of the device 110 to be remotely controlled by another device or by a person and to send/receive data and control signals over a network 205/210 (both shown in FIG. 2; e.g., BLUETOOTH, the internet, NFC, etc.). In some instances, a subset of the plurality of connected smart devices 110 physically located at/around a property 130 may be in networked communication with a hub device or home controller 135 that is also physically located at the property, and which can be used to control the devices 110 within the subset. In other instances, there may be no hub or home controller within a property 130, and the connected smart devices 110 are independently controlled.

Notably, the home controller 135 itself may be considered a connected smart device 110 within the scope of the present disclosure. Additionally or alternatively, connected smart devices 110 may include any network devices that communicatively connect one or more smart devices 110 to each other and/or to another communication network such as the internet. For instance, a wireless network router may be a connected smart device 110 and may also serve to connect other smart devices 110 to one or more communication networks.

In the exemplary embodiment, access control server 150 may retrieve data relating to the connected smart devices 110 located at each property 130 within the host's property portfolio. In some embodiments, access control server 150 may prompt the host user to submit a list of currently-installed connected smart devices 110, for example, as a fillable form, a voice prompt, and/or a text prompt, and/or may receive a natural language query from the host including currently-installed connected smart devices 110.

Additionally or alternatively, access control server 150 may autonomously retrieve data relating to the connected devices 110 currently installed within a property 130. For example, the access control server 150 may communicate with a local home controller 135 or network device (e.g., an internet router) that communicates with each of the connected smart devices 110 in the property 130, and retrieve information about the connected smart devices 110 via the home controller 135.

The access control server 150 may also collect data about different attributes of the property 130 via the connected smart devices 110, such as, but not limited to, the presence of one or more people, power usage, water usage, current temperatures, doors and/or windows open/closed and/or locked/unlocked, as well as current and future weather conditions and other parameters that may affect the property 130. The host user may provide the access control server 150 with access to data from the connected smart devices 110. These devices 110 may provide their data directly and/or provide data through servers associated with and in communication with the connected smart devices 110.

Once the connected smart devices 110 are identified, the access control server 150 receives or retrieves access credentials associated with the connected smart devices 110. These access credentials may be shared between devices 110 or may be unique to each individual device 110. For example, in some instances, the access credentials may be the network ID and password for a network router that connects other smart devices 110 to the internet (e.g., to a local communication network), and accessing that network enables access to one or more other smart devices 110. In other instances, access to a connected smart device 110 requires additional or alternative access credentials. The host user may input access credentials and/or provide permission for the access control server 150 to retrieve access credentials.

The access control server 150 may receive and/or retrieve respective device definitions associated with each device 110. These device definitions represent the various functions available at/by each connected smart device 110. For example, a television may have a device definition including an on/off function, a channel function, a volume function, and an input/source selection function, whereas a connected lighting device may have an on/off function only, or may also have a dimming function, color-change function, and/or timer function.

The access control server 150 organizes the device definitions for display within an interface of a host environment on a software platform, which the host user can access via their host user device 140 (e.g., a smart phone, laptop computing device, tablet, etc.). The access control server 150 also provides the host user with access parameters for each element of the respective device definitions. The access parameters define the boundaries of access to the corresponding device 110 that a guest user may have during a stay at the property 130, and are set by the host user within the host environment.

The access parameters may include a "universal" access parameter that can be set by the host user to entirely restrict access to that device 110. For instance, in the case of a controllable fireplace, the host user may set the universal access parameter to completely restrict usage of the fireplace such that the guest user may not turn on or otherwise operate the fireplace. Other access parameters may be set to defined access to a device 110 for a specific, limited period of time (e.g., only for the duration of the guest user's stay) or by a certain user device 140 or number of user devices 140. Access parameters may also be set to define or restrict access to certain features. For example, the host user may set the access parameters for a smart thermostat such that the guest user can change the temperature within a limited range.

In this way, the host user can provision customized access to the property 130 and the devices 110 therein, on a per-guest or per-stay basis. This capability may enhance the safety of a property 130, by limiting access to a door lock or network device only to a specific time and/or to a specific guest device(s) 140. The host user may also be able to customize access to a guest user based upon certain rates or features agreed to; for instance, a second bedroom or a rec room may remain locked for guests paying a lower rate, and may be unlocked for guests paying a premium rate.

The host environment enables the host user this level of customization across multiple properties 130 and across a calendar of scheduled stays. The host user may set access parameters on a per-property basis, such that a default access profile exists for each property 130. The host user may change any access parameter(s) on a per-stay basis, if applicable. In some embodiments, the access control server 150 may generate, identify, or recommend the default access profile for a property 130, after learning the host user's preferences over a threshold number of preliminary stays. As described further herein, where the access control server 150 learns the preferences of a guest user, the access control server 150 may prompt the host user to change one or more access parameters from the default access profile, for the stay associated with that guest user. The access control server 150 may also prompt the host user to change access parameters in response to trends in guest user preferences within a geographic region, for example.

The host user may also control the access parameters based upon whether the property 130 is occupied or unoccupied. For example, the host user may restrict access to a smart thermometer and set the temperature at some idle temperature when there is no recorded stay taking place at the property 130. The host user may change access credentials of one or more devices when a property 130 is unoccupied and/or between stays, such as a code for a smart lock on an entry door of the property 130.

In addition to the customization of access to the property and devices, the host environment also enables the host user to input content associated with the connected smart devices 110 and their functions, for subsequent use by the guest user(s). The host user may input text content, audio content, image content, video content, and the like, related to each connected smart device 110. The content may be instructional or educational content to advise the guest user about the function(s) of the device 110, risks or warnings about operation of the device 110, indications about the access limitations of the device 110, and the like.

The host user may select or input one or more instructions regarding the display of the content to the guest user. For example, the host user may define whether any content is automatically provided to the guest user based upon some other action or condition, where/how to display or otherwise provide a link to the content, who can access the content, and the like. The access control server 150 may also enable the host user to input property-level content, or content not associated with anyone connected smart device 110. This property-level content may include recommendations, "house rules," and the like. In certain embodiments, instructions on how to operate various smart devices may be presented to the user, such as a short-term home renter, via video and/or audible content presented via AR glasses, VR headsets, a voice bot or chatbot, a ChatGPT-based bot, or a mobile device, such as a smart phone.

In some embodiments, the access control server 150 is configured to receive and/or retrieve market details associated with each connected smart device 110 and, in some instances, with one or more other objects or features within or around the property 130. The market details may include a brand, price, location of purchase, etc. The host user may provide the market details and/or may select which connected smart devices 110 and/or objects for which to provide or retrieve the market details. Based upon a designation of the object, which the access control server 150 may receive as user input from the host user or that the access control server 150 may determine based upon the device definition, the access control server 150 may retrieve market details for a device or object from an external source (e.g., the internet). In some cases, the host user may capture an image or video of a device or object, and the access control server 150 may be configured to perform one or more image processing or object recognition processes on the image or video of a connected smart device 110 or object at the property 130, to retrieve market details from an external source (e.g., a marketplace server 240, as shown in FIG. 2).

The host environment may also enable the host user to set preferences for receiving notifications or alerts related to the property 130 and/or to certain connected smart devices 110. For example, the host user may set a preference that they receive an alert when the property 130 is first accessed at the beginning of stay. As another example, the host user may set a preference to receive an alert when a smoke detector or carbon monoxide detector is activated, or when a water sensor in a basement indicates the presence of water (e.g., in the event the basement floods).

In the exemplary embodiment, one or more guest users may "book a stay" or request a short-term rental at a property 130 using a property-sharing platform. The access control server 150 may maintain the property-sharing platform, may be associated therewith, or may be completely separate from the property-sharing platform and receive data from the platform over an API or other connection. The details of the stay may be defined and stored within a rental record. For example, the rental record includes an indication of a number of guests, a start date and end date of the short-term rental (and, therefore, a duration of the rental), and a shared space identifier (e.g., "shared room," "private room," "whole property," etc.) identifying which space(s) of the property 130 are to be shared with the guest user(s) during the short-term rental.

The host user may instruct the access control server 150 to provision the access—as defined by the set access parameters—to a guest user for the duration of their stay. This process may be manually initiated by the host user, for example, within a period of time preceding a scheduled stay. Additionally or alternatively, the access control server 150 may be configured to automatically initiated access provisioning based upon the rental record of a scheduled stay. In one exemplary embodiment, to provision access to the property, the access control server 150 transmits an invitation message to a user device 140 of the guest user. The invitation message, once accessed by the guest user, causes display of a link to an alternative environment of the software platform, referred to herein as the guest environment. The link may a hyperlink, a selectable icon, or any other selectable feature. Additionally, the link includes one or more parameters or data elements such that, upon selection of the link by the guest user, the link causes display of the guest environment unique to the guest user. In some instances, selection of the link causes the user device 140 to execute a web browser to display a landing webpage, or to execute a separate software application ("app") that hosts the guest environment. The webpage or app may be associated with the access control server 150 itself or may be an add-in to an existing webpage or app, such as a webpage or app associated with a property sharing service (e.g., AIRBNB, VRBO, etc.).

The guest environment may be much more limited in scope than the host environment, based upon the access parameters set by the host user. In the exemplary embodiment, even the access to the guest environment is limited based upon the access parameters, such as based upon a duration of the guest user's stay in the property or a guest user's proximity to the property. For example, the host user may instruct the access control server 150 to transmit the link to the guest environment within a defined time period preceding a guest user's stay, or when the user device 140 of the guest user is within a threshold distance to the property 130 (e.g., within a threshold number of miles).

The guest environment, when accessed by the guest user, displays selectable options associated with the connected smart devices 110 within the property 130 in which the guest is staying. The selectable options are limited according to the access parameters set by the host user. For example, if a host user has defined a limited temperature range of a spa or hot tub, or has restricted use of the spa entirely, the guest environment may only provide selectable options that enable the guest user access to the spa or hot tub within the access parameters.

In one exemplary embodiment, an initial display state of the guest environment is related to the default access profile for the property 130 at which the guest user is staying. For example, where a default or initial state of the temperature has been set to X degrees, the access credential for a door lock to an entry has been set to 1234, and the state of a foyer light has been set to "On:Dim", the guest environment may display the initial state of these connected smart devices 110. In some instances, a host user may restrict the guest user from changing any aspect of the default access profile before the guest user arrives at the property 130 and/or before the stay commences. In other instances, some or all settings may be changed—within the scope of the set access parameters—within some threshold period of time preceding a stay or when the guest user is within some threshold distance of the property 130.

The customized guest environment, which is associated with a particular guest user for a particular stay at a particular property 130, may also be accessible only to particular user devices 140 or under certain conditions. In some instances, the access control server 150 may associate a customized guest user environment with a phone number or device ID of a guest device 140, and only that guest device 140 may access the link and/or the guest user environment. In other instances, the access is limited to user devices 140 within a threshold distance of the property or connected to a network associated with the property 130. For example, the guest device 140 may only be able to access the guest environment when connected to the Wi-Fi (e.g., a local communication network) at a property 130. In some cases, only certain features or connected smart devices 110 have such defined or limited access. For example, the guest environment may only have access to selectable options that control features of a smart oven when their user device 140 is connected to the Wi-Fi at the property 130, preventing inadvertent operation of the smart oven when the guest user is not at the property 130.

In some embodiments, the guest environment may enable the guest to connect their personal profile to one or more connected smart devices 110 during the duration of their stay. For example, the guest user may be able to connect their profile for a particular video streaming service to a television within the property 130. Or the guest user may be able to connect their profile to a music streaming service to a smart speaker within the property 130.

In some cases, the guest environment provides a selectable option associated with the property 130 and/or the device(s) 110 that can be connected to the personal profile of the guest user. For example, there may be an icon that displays the text "Sign Me In." Upon selection of the icon, the guest user may be prompted through a series of commands or webpages that facilitate a connection with the guest user's personal profile (e.g., via an API connection, a Matter Protocol connection, etc.). In some embodiments, a guest user may pre-load information associated with their personal profile(s) into the guest environment, such that when the guest user arrives at the property 130 or selects a "sign in" command, the access control server 150 uses the preloaded information to log into and/or connect to the guest user's personal profile(s) without any further action or input by the guest user. Advantageously, the access control server 150 may be configured to automatically disconnect any personal profiles from the connected smart device(s) 110 associated with a property 130, at the end of a guest user's scheduled stay.

The selectable options within the guest environment may also include or be related to the content associated with the connected smart devices 110. The guest user may selectively and manually access the content as desired. For example, a guest user may access instructional content associated with a smart thermometer when the guest user wishes to learn how to change or set a temperature. As described above, the instructional content may be text-based, video-based, etc.

Additionally, some content may be automatically displayed based upon certain conditions. For example, an introductory or welcome video may auto-play on the user device 140 of the guest user after the guest user operates a smart lock on an entry to the property 130. The content may also be accessible via a "help" function within the guest environment. The access control server 150 may be configured to initiate an AI-based chat session (e.g., using an AI engine 230, as shown in FIG. 2) in response to the selection of the help function. The access control server 150 may interpret a query input by the guest user and process the content associated with the connected smart devices 110 (and/or other objects) at the property 130 to provide a response to the user's query.

In some embodiments, the guest user may interact with the user interface of the guest environment to select an augmented reality (AR) feature associated with the property 130. This feature may enable the guest user to capture live video of the property 130, specifically of one or more connected smart devices 110. The access control server 150 receives a stream of the live video and performs one or more object recognition processes and/or device recognition processes (e.g., to detect a heading, orientation, position, location, etc., of the user device 140 capturing the live video) to determine which connected smart device 110 is featured in the stream of the live video. The access control server 150 may transmit content to the user device 140 and/or may cause display of content on the user device 140, as an augmented reality overlay upon the live video displayed on the user device 140. The overlay may include a link to content associated with the connected smart device 110 or may include the content itself. For example, when a guest user captures live video of a smart thermostat, the overlay may include an instructional video related to operation of the smart thermostat that is programmed to autoplay, or to play upon selection of a "play" command by the guest user. The access control server 150 may additionally or alternatively display market details associated with that connected smart device 110. In some embodiments, the access control server 150 displays, as part of the market details, a link to purchase a connected smart device 110, object, or service.

In some instances, the access control server 150 may detect an object other than a connected smart device in the stream of the live video, where the object has content or market details associated therewith. As one example, the host user may have input instructional content associated with operation of a shower into the software platform. When a guest user captures live video of the shower during an augmented reality session, the access control server 150 may initiate display of the instructional content as an overlay on the live video of the shower.

As described further herein, the access control server 150 is further configured to use data collected from connected smart devices 110 during one or more stays to generate recommendations to the host user for future stays by other guest users.

Exemplary Source Devices

Figure 3:
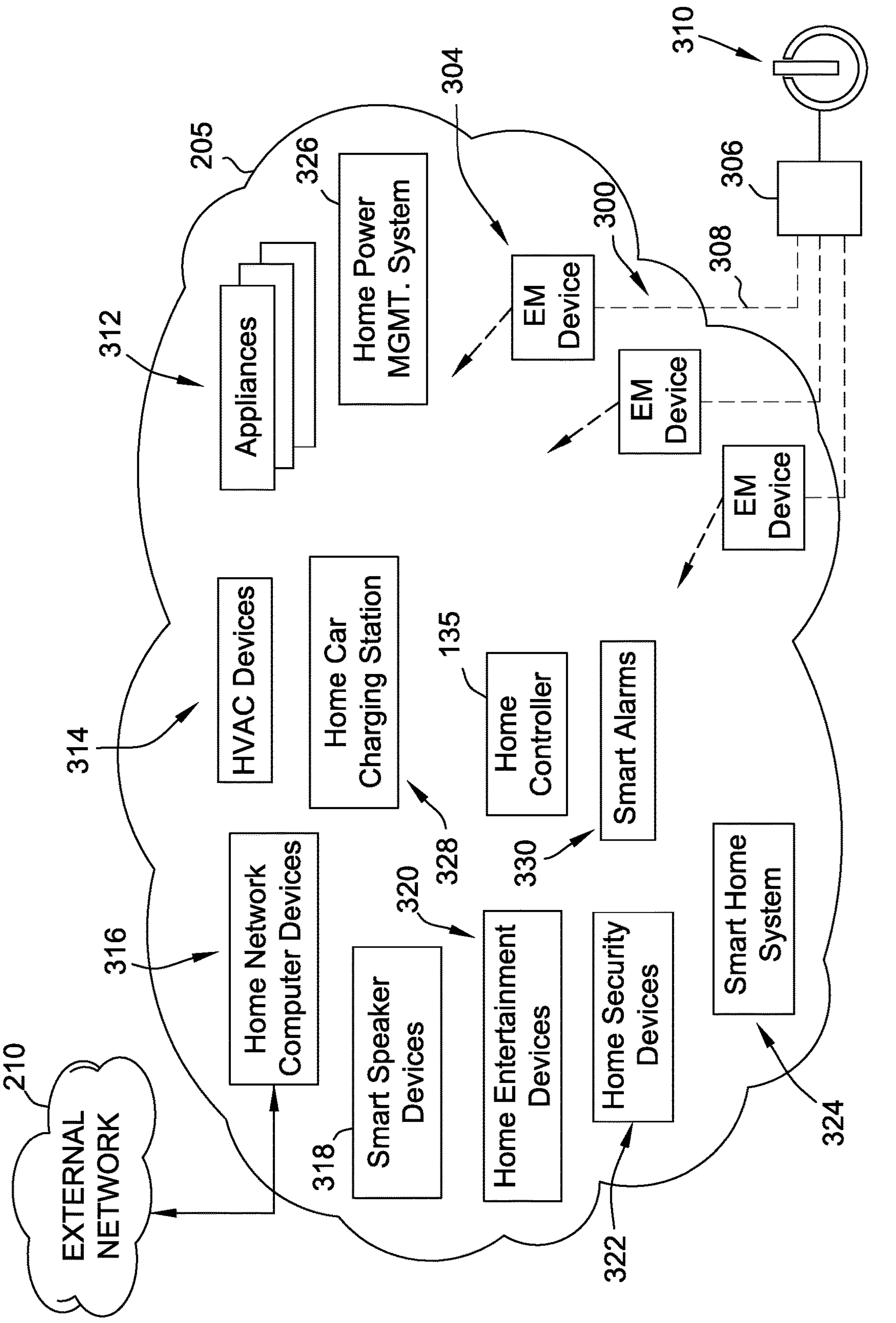
FIG. 3 illustrates exemplary source devices that may be used with the systems shown in FIGS. 1 and 2.

FIG. 3 illustrates exemplary connected smart devices that may be used with the system 100 (shown in FIG. 1) and/or the PDAC system 200 (shown in FIG. 2). Because these connected smart devices represent a source of data associated with the property 130 and usage thereof by guest users, these devices are also referred to herein as source devices.

In one exemplary embodiment, the connected smart devices or source devices 110 (shown in FIG. 1) are computers that are able to communicate with the home controller 135 and/or the access control server 150 (both shown in FIG. 1) using the Internet, a local area network (LAN), a wide area network (WAN), or other wired/wireless communication protocols. In some embodiments, the source devices 110 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Source devices 110 can be any device capable of accessing a network, such as the Internet, including, but not limited to, any kind of "smart" device, smart appliance, sensor, or component of a smart system, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices. In the exemplary embodiment, source devices 110 are devices connected to the local home network 205 (shown in FIG. 2) that provide information about the property 130.

In some embodiments, the home controller 135 is in communication with or otherwise monitors or collects data from a variety of source devices within the local network 205. The property 130, and the various source devices therein, may be powered by an electrical distribution system 300. Paths of electrical power flow are illustrated in FIG. 3 in broken lines. The electrical distribution system 300 includes multiple electrical circuits 308, each of which may provide power to one or more of the source devices or other electrical devices within the property 130. Each of the example circuits 308 emanate from an electrical distribution panel 306 that receives power from a power source 310, such as a utility power company or an on-premise power source (e.g., gas generator, solar generator, wind generator). Each circuit 308 may include a circuit breaker for each circuit 308 in the electrical distribution panel 306. While not expressly shown, any of the various source devices 110 may be connected to and powered by the electrical circuits 308.

In the exemplary embodiment, the systems 100 and 200 may include one or more electricity monitoring (EM) devices 304. EM devices 304 may be used to monitor electricity flowing to individual electric devices, such as smart devices or appliances, electronics, vehicles, or mobile devices, and may be configured to monitor or detect abnormal usage or trends. Abnormal electricity flow (EF) to various devices may indicate that failure is imminent, maintenance or device replacement is needed, de-energization is recommended, or other corrective actions are prudent. For example, the EM devices 304 may be TING® smart sensors such as those made commercially available by Whisker Labs of Germantown, MD.

EF data collected by the EM devices 304 may include data indicative of electricity flow to or from various smart or other electronic devices 110, including the various devices shown here in FIG. 3. EF data may also include electricity or energy usage for each electronic component, device, outlet, circuit, or the like, within the property 130, such as data indicating the electricity each device or room is using. For example, energy usage of air conditioners, washers, dryers, dish washers, refrigerators, stoves, ovens, microwave ovens, televisions, lamps, outlets, computers, laptops, mobile devices, other electronic devices, may be determined by the EM device 304. EF data may be used to monitor usage over time to identify trends or patterns of usage, identify malfunctioning devices, and/or detect hazards or other abnormalities that may indicate a risk to the property 130 or its assets.

EM devices 304 may include sensors that are configured to monitor and collect EF data. EM devices 304 may be plugged into electrical outlets within the home (e.g., conventional 110-volt outlets) for at least powering the EM device 304 and/or devices 110, or may be electrically wired into a circuit 308 for powering the EM device 304 and/or devices 110. Further, some EM devices 304 may collect EF data directly from a circuit 308 (e.g., via wired connection to the circuit 308, referred to herein as "direct sensing") and some EM devices 304 may wirelessly collect EF data from circuits 308, appliances, or other electricity consuming devices (referred to herein as "wireless sensing"). Wireless sensing may include, for example, sensors within the EM device 304 that are configured to sense electromagnetic waves or an electrical signature of the electrical devices receiving power from the electrical distribution system 300. The EM devices 304 may directly or wirelessly detect each flow of electricity to or from each different electronic device by identifying each electronic device by its unique electronic or electrical signature (or "fingerprint"). The EM devices 304 may then generate electricity usage or flow data for each electronic device within the home, or connected to the electrical distribution system 300 (such as a hybrid or fully electric vehicle having its battery directly or wirelessly charged by the home's electrical system). These electrical fingerprints may then be used to determine usage of devices and/or appliance within or near the home.

In some embodiments, EM devices 304 may be positioned in vicinity of the electrical distribution panel 306 and may capture electrical activity about the property 130 by wirelessly detecting an electricity flow to devices that are coupled to the electrical distribution board 306. In other embodiments, EM devices 304 may be positioned in vicinity of the electrical distribution panel 306, but not hardwired to the electrical distribution panel 306 or home electrical wiring system, and may capture electrical activity about the property 130 by wirelessly detecting an electricity flow to devices that are coupled to the electrical distribution board 306. In other embodiments, EM devices 304 may be plugged into electrical outlets positioned throughout a home.

During operation, as one or more of the electric devices receives electricity via the electrical distribution system 300, each device may be differentiated by an electrical signature that is unique to a respective device (such as by one or more EM devices 304 monitoring, detecting, and/or analyzing the electricity flowing to or being consumed by each respective electric device, and/or by monitoring EF data generated or collected by one or more EM devices 304).

Based upon the unique electrical signatures of the various electric devices of the property 130, the monitored electrical activity may be correlated with respective electric devices receiving the electricity transmitted via the electrical distribution system 300. Correlation of the electrical activity with the respective electrical devices may produce data indicating, for example, the time, duration, and/or magnitude of electricity consumption by each of the electric devices during a period of electrical activity monitoring.

Based upon at least the correlated electrical activity, a structure electrical profile may be built and stored at the EM devices 304 or at some other system (e.g., the home controller 135 or the access control server 150). The structure electrical profile may include, for each of the electric devices about the property 130, data indicative of operation of the respective electric device during at least the period at which the EM devices 304 monitored electrical activity about the property 130. Based upon the correlated electrical activity, the structure electrical profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure.

Thus, once the structure electrical profile is built, any electrical activity monitored via the home controller 135 and the EM device(s) 304 may be analyzed to determine whether electrical activity is abnormal. In response to the abnormal electrical activity, among other possible factors, corrective actions mitigate damage, prevent damage, and/or remedy the cause of the abnormal electrical activity the situation may be determined and/or initiated. Some possible corrective actions are discussed herein.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the property 130 as a whole uses more or less electricity. Furthermore, the structure electrical profile may include a digital "map" of the property 130. A home map may indicate spatial locations of the electric devices, and/or spatial relationships between two or more of the electric devices. In some embodiments, the home map may be configurable by a user (e.g., the homeowner of the property 130).

In some embodiments, the local home network 205 may include a home power management system 326. The home power management system 326, or the controller 135 in conjunction with the EM devices 304, may collect power consumption data on the circuits 308 (e.g., via EM devices 304) or device electrical usage data of various electronic devices within the property 130. The home power management system 326 may, for example, collect usage data for lights or appliances within the property 130, giving an indication of how much electricity the property 130 uses or how frequently occupants are at the property 130. In some embodiments, the property 130 may include one or more smart plugs (not separately shown) which may be managed by the power management system 326, the smart speaker device 318, the smart home system 324, or otherwise by the systems 100 and 200 (e.g., for activating or deactivating devices plugged into the circuits 308 via the smart plugs, such as via 110-volt outlets).

The home power management system 326 may identify and provide details on what appliances or other consuming devices are within the property 130 (e.g., manufacturer make and model), thereby allowing the systems 100 and 200 to identify some property on the premises (e.g., device identification and verification, device count), evaluate value of devices (e.g., replacement costs), or collect manufacturer-provided or consumer protection-provided details regarding the devices from external data sources 215 or the manufacturer 105 itself (e.g., susceptibility of the device to power surges, likelihood of fire caused by the device, mean time to failure of the device, types of device failures, power consumption profiles and tolerances of the device, or the like).

In the exemplary embodiment, the property 130 may include one or more smart appliances 312 (e.g., appliances that can communicate via the local network 205, which may include devices 110). Smart appliances 312 may include, for example, dish washers, microwaves, stove tops, ovens, grills, clothes washers and dryers, water heater, water meter, water softener or purifier, smart lighting, smart window blinds or shutters, piping, interior or yard sprinklers, or the like. The home controller 135 may be configured to communicate with such smart appliances 312 and may collect home data from such appliances for the systems 100 and 200.

For example, the appliances 312 may provide data such as device data (e.g., manufacturer, make, model, date of manufacturer, date of installation, software or firmware versions), usage data (e.g., daily usage time, power consumption), or log data (e.g., log events, alerts, component failure detections, maintenance history, or the like). Such appliance data may allow the systems 100 and 200 to detect which appliances are present in the property 130 (broadly, as a part of an "asset inventory" of the house), their replacement value, age of each appliance, a maintenance history of each appliance, to detect when appliances or their components are failing.

In the exemplary embodiment, the property 130 may also include smart HVAC devices such as, for example, a heater (e.g., a gas or electric furnace), an air conditioner, an air purifier, an attic fan, a ceiling fan. Some or all such devices may be controlled by a thermostat device. Such devices are collectively referred to herein as HVAC devices 314, some of which may not be smart devices but may nonetheless be controlled in some aspect by the thermostat device. The systems 100 and 200 may collect HVAC data such as device data (e.g., manufacturer, make, model, date of manufacturer, date of installation), usage data (e.g., daily usage time, power consumption), or thermostat data (e.g., temperature settings, daily schedule profiles).

The property 130, in the exemplary embodiment, may also include various computing devices such as, for example, desktop or laptop personal computers, tablet computers, servers, or networking devices (e.g., Wi-Fi routers, switches, hubs, firewalls, or the like), all of which are collectively represented here as home network/computer devices (or just "computer devices") 316. The networking devices may provide some or all of the local network 205 that is used to facilitate communication between the devices shown here. The home controller 135 may be configured to capture computer device data from some or all of these computer devices 316 such as, for example, a number and type of computing devices (e.g., hardware manufacturer, make, model, and the like), hardware and software profile of computing devices, configuration data of computing devices (e.g., software versions, firmware versions), usage data, and log data (e.g., firewall logs, access logs, software patch logs, error logs).

In the exemplary embodiment, the property 130 may include a smart speaker device(s) (or "nest device") 318 that may interact with occupants of the property 130 (e.g., via audible commands and responses, digital display, executing pre-configured actions). Some example smart speaker devices 318 include the Echo® devices (Amazon Inc., of Seattle, Washington) and the Google Nest® devices (Alphabet Inc., of Mountain View, California), to name but a few. The smart speaker device 318 may include a speaker for providing audio output, a microphone for receiving audio input (e.g., commands spoken by the occupants), and may include a display device for video output or a camera device for capturing video input. The smart speaker device 318 may be configured to interact with other smart devices, such as for controlling lighting within the property 130, the thermostat (e.g., changing thermostat settings), home security devices of a home security system 322 (e.g., locking and unlocking smart locks on doors, opening or closing garage doors, or the like), or entertainment devices of a home entertainment system 320 (e.g., enabling, disabling, or reconfiguring music or television devices).

The systems 100 and 200 may, with owner configuration and permission, utilize inputs from the smart speaker device 318 to, for example, determine a number of unique occupants of the property 130 (e.g., via unique speech profile or video identification), determine when guest users (or other persons) are currently present (e.g., via noise detection, video movement), determine when other devices are turned on or off, determine presence of pets (e.g., via unique audio sounds or video identification of the pets), or smoke or carbon monoxide alarm detection (e.g., via audible sound). Such raw data may be sanitized or distilled by the home controller 135 into refined data before sending to the access control server 150 in an effort to protect privacy of the occupants (e.g., sending results determined from the raw audio or video data and deleting the raw audio or video data). The systems 100 and 200 may anonymize personal data, thereby allowing data to be stored or used without direct attribution of data to a particular user.

In the exemplary embodiment, the property 130 may include various home entertainment devices 320 such as, for example, televisions, digital video recorders ("DVR"), radios, amplifiers, speakers, remotes, or console gaming systems, any or all of which may be smart devices in communication with the home network 205 and the controller 135. The controller 135 may collect home entertainment data from such devices.

The property 130, in the exemplary embodiment, may include a home security system 322. The home security system 322 may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the property 130, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that can detect potential contemporaneous risks to the property 130 or its occupants (e.g., intrusion, fire, health). The home security system 322 may be configured to communicate with a third-party security service or local authorities, and may transmit alerts to such parties when events are detected.

The home controller 135 may be configured to receive alert data from the home security system 322 and may transmit such alerts to the access control server 150, create historical logs of security events, or transmit alert events directly to the host user (e.g., via SMS text message or the like) or to local authorities, fire protection, or emergency services. The systems 100 and 200 may use such security alert events to, for example, determine how frequently security events occur (e.g., as a factor for risk), how often such events are warranted (e.g., authentic risks rather than false alarms), or the type and nature of such authentic risks or false alarms.

The systems 100 and 200 may use raw data collected directly from any of these security devices. For example, the home controller 135 may use raw data from the motion sensors to detect when the property 130 is occupied, may use raw data from the camera devices or door devices to detect when occupants enter or exit the property 130, may use the camera devices to determine a number of occupants of the property 130 or a number and type of pets in the property 130. The home controller 135 may determine information about the home security system 322 installed within the home, such as a number and type of security sensors installed within the property 130, a type of home security system 322 installed in the home (e.g., third-party service provider, device manufacturers, types of security protection implemented within the home), or how often the property 130 is left unoccupied without activating the home security system 322 (e.g., as a factor in risk calculations).

In some embodiments, the property 130 may include a smart home system 324 (e.g., a home monitoring system) that allows the host user and/or guest user(s) to control various devices within the property 130. For example, the smart home system 324 may be configured to control, inter alia, devices such as the smart appliances 312, HVAC devices 314, home entertainment devices 320, or home security system 322. In the exemplary embodiment, the home controller 135 may be configured to interact directly with such devices as described herein ("direct access"), or may be configured to perform some interactions and data collections with such devices through the smart home system 324 ("proxy access"). For example, any or all of the data collections or operations described herein may be performed by the smart home system 324 based upon commands received from the home controller 135, thereby allowing the systems 100 and 200 to perform such operations through the smart home system 324 acting as a proxy for some such operations.

In the exemplary embodiment, the property 130 may include one or more smart alarms 330 that are configured to detect various conditions within the property 130 and may alert the host user or occupying guest user(s) (e.g., via audible alarm, SMS text message, email, or the like). Smart alarms 330 may include, for example, smoke detectors, carbon monoxide detectors, carbon dioxide detectors, or indoor air quality ("IAQ") monitors or systems that include sensors configured to, for example, detect dangerous conditions such as fire or buildup of carbon monoxide, the presence of dangerous pollutants such as radon or various volatile organic compounds ("VOC"), or collect various air quality data such as temperature and humidity.

Smart alarms 330 may include water leak detectors or flood alarms that may be configured to detect the presence of water at various areas in the property 130, such as near HVAC equipment, water tanks, sump pumps, below showers or bathtubs, around basement perimeters, behind or within basement walls, or the like. Such water detectors may identify leaks within plumbing or appliances within the property 130 or ingress of water into the property 130 (e.g., rainwater, flooding, failing sump pump, foundation cracks, or the like). The system 100 may collect alarm data from the smart alarms 330 and may perform automatic alerting based upon sensor events registered at such smart alarms 330 (e.g., alerting emergency services, homeowner, or the like, in an effort to protect life and property, mitigate damage, or such) or initiate automatic actions (e.g., shutting off water flow within the property 130, or within a particular segment of plumbing, via activating a smart water shut off valve, not separately shown).

Exemplary Server Device

Figure 4:
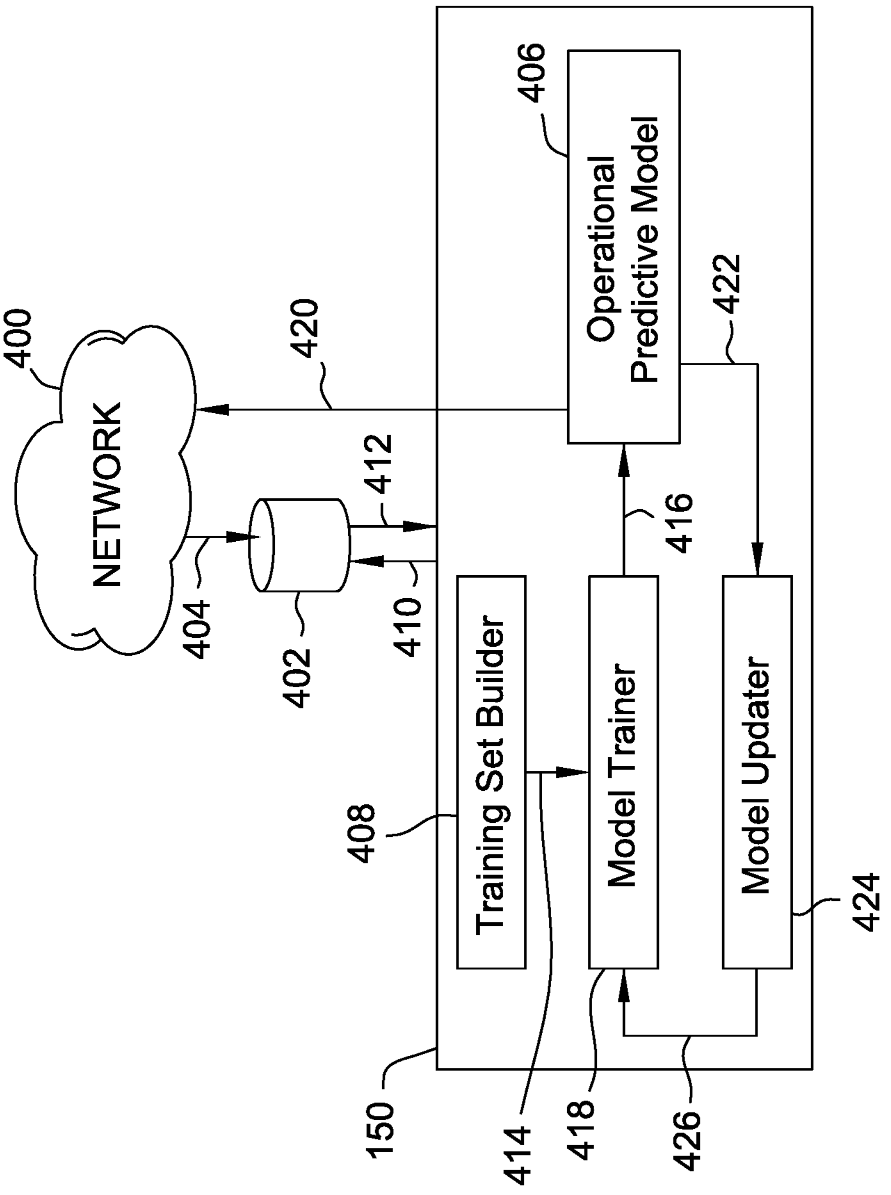
FIG. 4 is a schematic diagram of an exemplary access control server computing device that may be used with the systems shown in FIGS. 1 and 2.

FIG. 4 is a schematic diagram illustrating further detail of server computing device 150 (shown in FIG. 1), such as an access control server 150. Server computing device 150 may communicate with other components of system 100, such as manufacturer server 105, connected smart devices 110, home controllers 135, and/or user devices 140, via a network 400. Server computing device 150 may include and/or be in communication with a database 402 that stores data 404 including data collected from one or more properties 130, one or more devices 110, and/or one or more user devices 140, related to rental of properties 130 by guest users. Data 404 received from network 400 may be stored in database 402. Server computing device 150 may configured to use data 404 to generate an operational predictive model module 406 (e.g., as part of AI engine 230) for learning user preferences and usage patterns and for generating recommendations to a host user and/or guest user of a particular property 130.

In exemplary embodiments, server computing device 150 includes a training set builder module 408 configured to submit one or more queries 410 to database 402 to retrieve subsets 412 of data 404, and to use those subsets 412 to build training data sets 414 for generating operational predictive model 206. For example, query 410 may be configured to retrieve certain fields from data 404 for properties 130 having certain similar aspects, such as being located in similar (e.g., nearby) geolocations, for guest users having similar preferences, for one particular guest user's preferences across stays and properties, and the like.

In exemplary embodiments, training set builder module 408 may be configured to derive training data sets 414 from retrieved subsets 412. Each training data set 414 corresponds to a historical data 404 ("historical" in this context means completed in the past, as opposed to completed in real-time with respect to the time of retrieval by training set builder module 122). Each training data set 414 may include "model input" data fields along with at least one "result" data field representing a historical outcome associated with the model input. The model input data fields represent factors that may be expected to, or unexpectedly be found during model training to, have some correlation.

In exemplary embodiments, the model input data fields in training data sets 414 may be generated from data fields in subset 412 corresponding to historical data 404. In other words, a trained machine learning model 416 produced by a model trainer module 418 for use by operational predictive model module 406 is trained to make predictions based on input values that can be generated from the data fields in data 404. Values in the model input data fields may include values copied directly from values in a corresponding data field in the retrieved subset 412, and/or values generated by modifying, combining, or otherwise operating upon values in one or more data fields in the retrieved subset 412. Values in the model input data fields may include connected smart devices 110 that may be installed in properties 130 connected smart devices 110 that have already been installed in a particular property 130, usage of those devices 110, guest behavior, etc. The use of such data fields as model input data fields facilitates the machine learning model in weighing these factors directly.

After training set builder module 408 generates training data sets 414, training set builder module 408 passes the training data sets 414 to model trainer module 418. In example embodiments, model trainer module 418 is configured to apply the model input data fields of each training data set 414 as inputs to one or more machine learning models. Each of the one or more machine learning models is programmed to produce, for each training data set 414, at least one output intended to correspond to, or "predict," a value of the at least one result data field of the training data set 414. "Machine learning" refers broadly to various algorithms that may be used to train the model to identify and recognize patterns in existing data in order to facilitate making predictions for subsequent new input data.

Model trainer module 418 is configured to compare, for each training data set 414, the at least one output of the model to the at least one result data field of the training data set 414, and apply a machine learning algorithm to adjust parameters of the model in order to reduce the difference or "error" between the at least one output and the corresponding at least one result data field. In this way, model trainer module 418 trains the machine learning model to accurately predict the value of the at least one result data field. In other words, model trainer module 418 cycles the one or more machine learning models through the training data sets 414, causing adjustments in the model parameters, until the error between the at least one output and the at least one result data field falls below a suitable threshold, and then uploads at least one trained machine learning model 416 to operational predictive model module 406 for application to generating recommendations 420. In exemplary embodiments, model trainer module 418 may be configured to simultaneously train multiple candidate machine learning models and to select the best performing candidate for each result data field, as measured by the "error" between the at least one output and the corresponding result data field, to upload to operational predictive model module 406.

In certain embodiments, the one or more machine learning models may include one or more neural networks, such as a convolutional neural network, a deep learning neural network, or the like. The neural network may have one or more layers of nodes, and the model parameters adjusted during training may be respective weight values applied to one or more inputs to each node to produce a node output. In other words, the nodes in each layer may receive one or more inputs and apply a weight to each input to generate a node output. The node inputs to the first layer may correspond to the model input data fields, and the node outputs of the final layer may correspond to the at least one output of the model, intended to predict the at least one result data field. One or more intermediate layers of nodes may be connected between the nodes of the first layer and the nodes of the final layer. As model trainer module 418 cycles through the training data sets 414, model trainer module 418 applies a suitable backpropagation algorithm to adjust the weights in each node layer to minimize the error between the at least one output and the corresponding result data field. In this fashion, the machine learning model is trained to produce output that reliably predicts the corresponding result data field. Alternatively, the machine learning model may have any suitable structure.

In some embodiments, model trainer module 418 provides an advantage by automatically discovering and properly weighting complex, second- or third-order, and/or otherwise nonlinear interconnections between the model input data fields and the at least one output. Absent the machine learning model, such connections are unexpected and/or undiscoverable by human analysts.

The access control server 150 of the present disclosure is configured to coordinate a property ecosystem based upon the preferences of and/or commands from the host user. The access control server 150 may be configured to derive unique insights related to the property ecosystem, and/or to host users and guest users interacting therewith, via the AI engine 230, implementing the operational predictive model module 406. In one exemplary embodiment, the access control server 150 executes the operational predictive model module 406 programmed to learn, without limitation, preferences of host users, preferences of guest users, behaviors of guest users, preference/behavior trends across guest users within a property 130, preference/behavior trends across guests users within all or a subset of properties within a property portfolio, preference/behavior trends across guests users within a geographic region including one or more properties, usage profiles associated with properties, operation profiles of connected smart devices 110 within or around one or more properties, and product lifecycles or failure profiles of connected smart devices 110.

To facilitate this learning, the access control server 150 includes one or more databases 402 at which the data collected from the connected smart devices 110 is stored. The system may also collect data from the user device(s) 140 of the host user and from the user device(s) 140 of the guest users. In the exemplary embodiment, the access control server 150 provides to each user one or more opt-in options, in which the user can permission the system to collect data associated with the user's interaction with the access control server 150 and/or with the connected smart devices 110. The access control server 150 may also communicate to the user(s) that usage data is being collected from the connected smart devices 110. Based upon the user's opt-in preferences, the usage data may be anonymized or only used in an aggregated fashion. This data becomes one or more input training sets used by the training set builder 408 for the AI engine 230.

The access control server 150 is configured to provide the host user with the model outputs in a dashboard interface within the host environment (e.g., via the environment handling engine 225). The model outputs can be formatted as visual representations of trends, as text-based or natural language recommendations, as proposed adjustments to a default access profile for a property 130, and the like. Some examples of model outputs may include, without limitation, recommendations of access parameters on a per-guest or per-property basis; recommendations of connected smart devices 110, based upon which products have been used most often, have functioned better, or have better connectivity/functionality with guest user devices; and recommendations of content to input or update, based upon frequent guest queries.

In some embodiments, the access control server 150 executes the AI engine 230 to generate guest user profiles, as guest users perform two or more stays across one or more properties (which do not need to be in a single property portfolio). These guest user profiles reflect guest preferences, such as an ambient temperature, choice of music, preferred streaming profiles, and the like. The access control server 150 may recommend, to a host user, a customized access profile for a property in advance of a guest user's stay, in which the access parameters are automatically selected or tuned to the guest user's preference, based upon the guest profile.

The access control server 150 may also leverage the guest user profile to customize the guest environment for a guest user during a stay (e.g., via the environment handling engine 225). For example, the access control server 150 may customize the guest environment such that selectable options associated with a guest user's most frequently used connected smart devices 110 are displayed first or in a more prominent display section. The access control server 150 may push content, such as instructional videos or text, to the guest user when a connected smart device 110 is a different brand, make, or model than any connected smart device the guest user has previously interacted with (while registered with the access control server 150 as a guest user).

In exemplary embodiments, operational predictive model module 406 may compare feedback, and may route a comparison result 422 generated by comparing recommendation 420 to the feedback to a model updater module 424 of the access control server 150. Model updater module 424 is configured to derive a correction signal 426 from comparison results 422 received for one or more recommendations 420, and to provide correction signal 426 to model trainer module 418 to enable updating or "re-training" of the at least one machine learning model to improve performance. The retrained at least one machine learning model 416 may be periodically re-uploaded to operational predictive model module 406.

Exemplary Server Device

Figure 5:
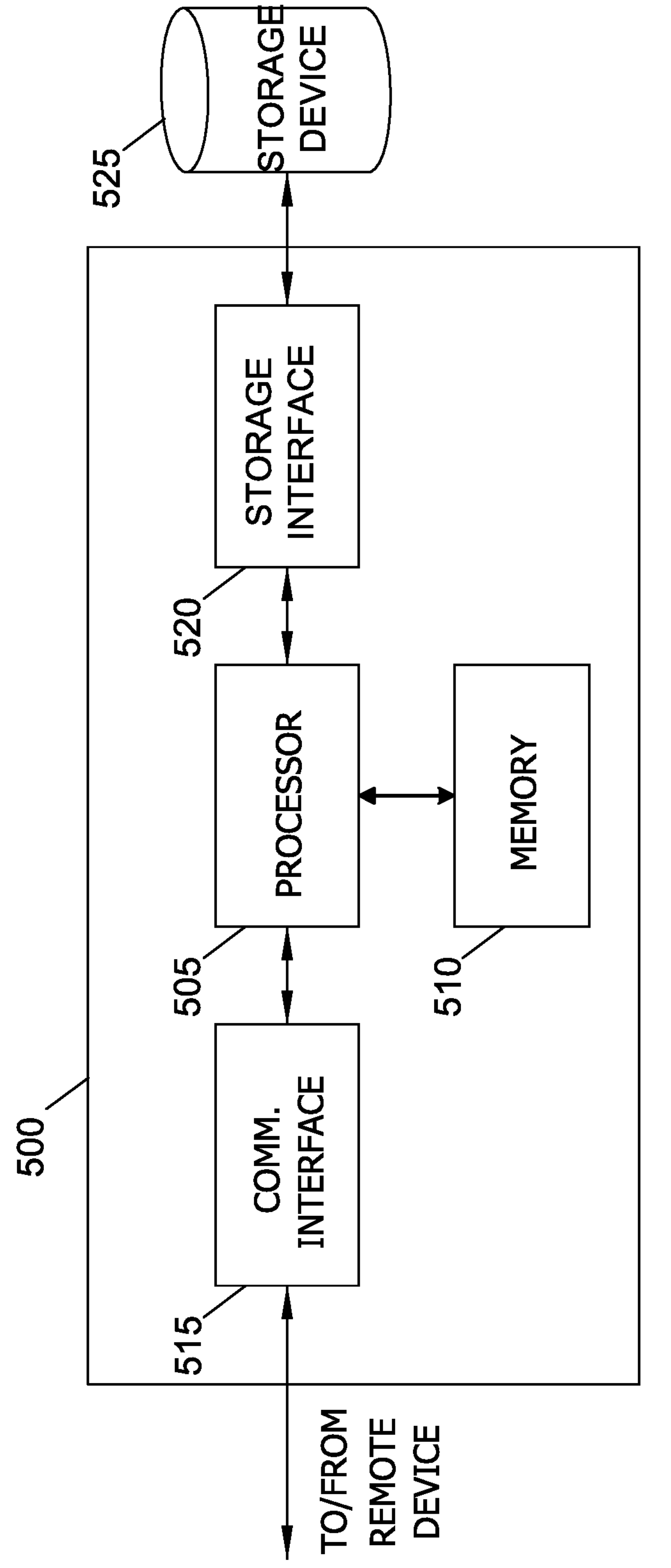
FIG. 5 depicts an exemplary configuration of a server computer device that may be used with the systems shown in FIGS. 1 and 2.

FIG. 5 depicts an exemplary configuration of a server 500, such as server 150 shown in FIG. 1, in accordance with one embodiment of the present disclosure. Server computer device 500 may include, but is not limited to, manufacturer server 105, home controller 135, access control server 150 (shown in FIG. 1), external data sources 215, marketplace server 240 (both shown in FIG. 2), home security system 322, smart home system 324, and home power management system 326 (all shown in FIG. 3). Server computer device 500 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 500 is capable of communicating with a remote device such as another server computer device 500, marketplace server 240, connected smart devices 110, or user devices 140. For example, communication interface 515 may receive requests from user devices 140 via the Internet, as illustrated in FIG. 4.

Processor 505 may also be operatively coupled to a storage device 525. Storage device 525 may be any computer-operated hardware suitable for storing and/or retrieving data, such as, but not limited to, data associated with database 402 (shown in FIG. 4). In some embodiments, storage device 525 may be integrated in server computer device 500. For example, server computer device 500 may include one or more hard disk drives as storage device 525. In other embodiments, storage device 525 may be external to server computer device 500 and may be accessed by a plurality of server computer devices 500. For example, storage device 525 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Figure 7:
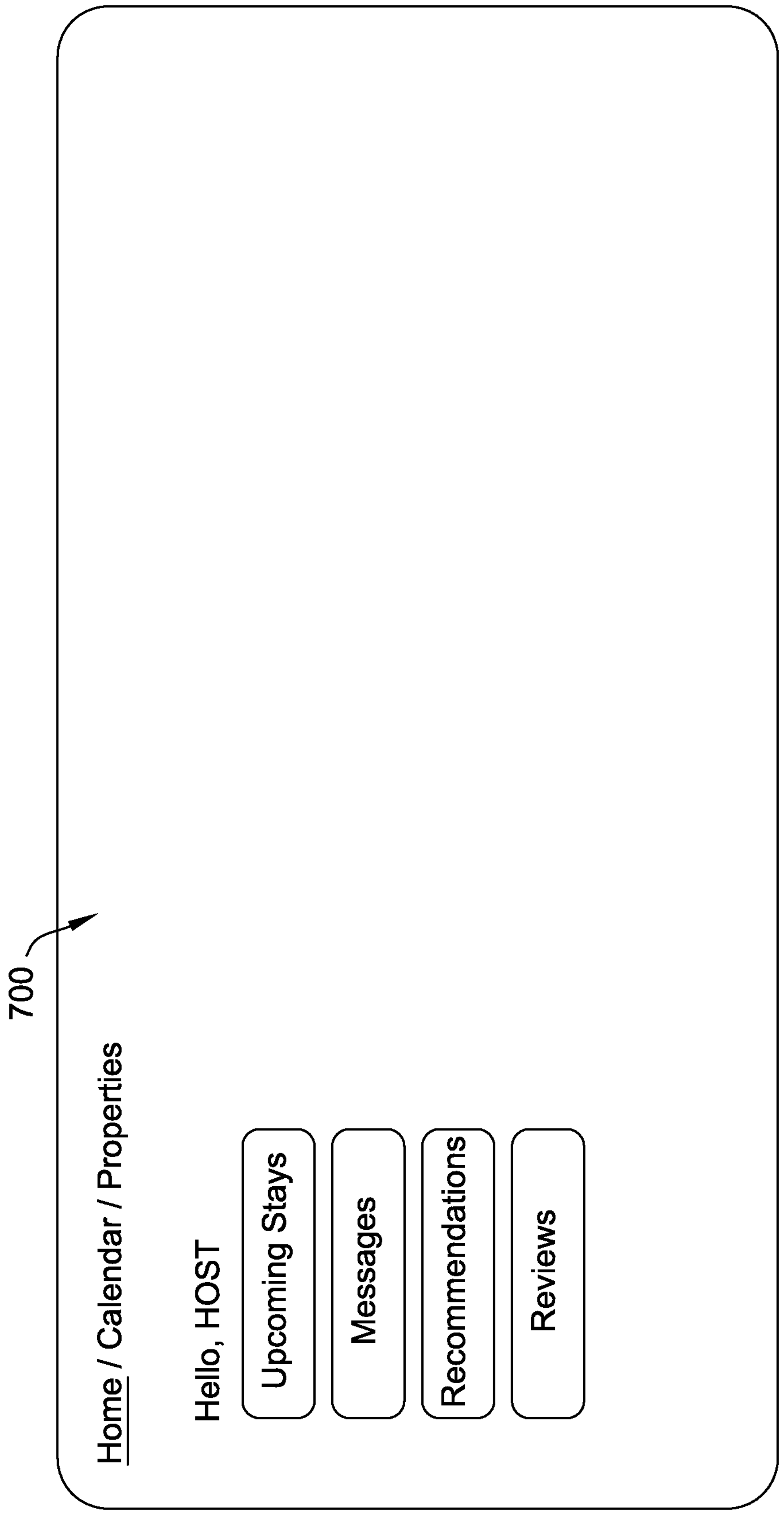
FIGS. 7-10 illustrate an exemplary host user environment, including various exemplary user interfaces.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instructions such as illustrated in FIG. 7.

Exemplary Client Device

Figure 6:
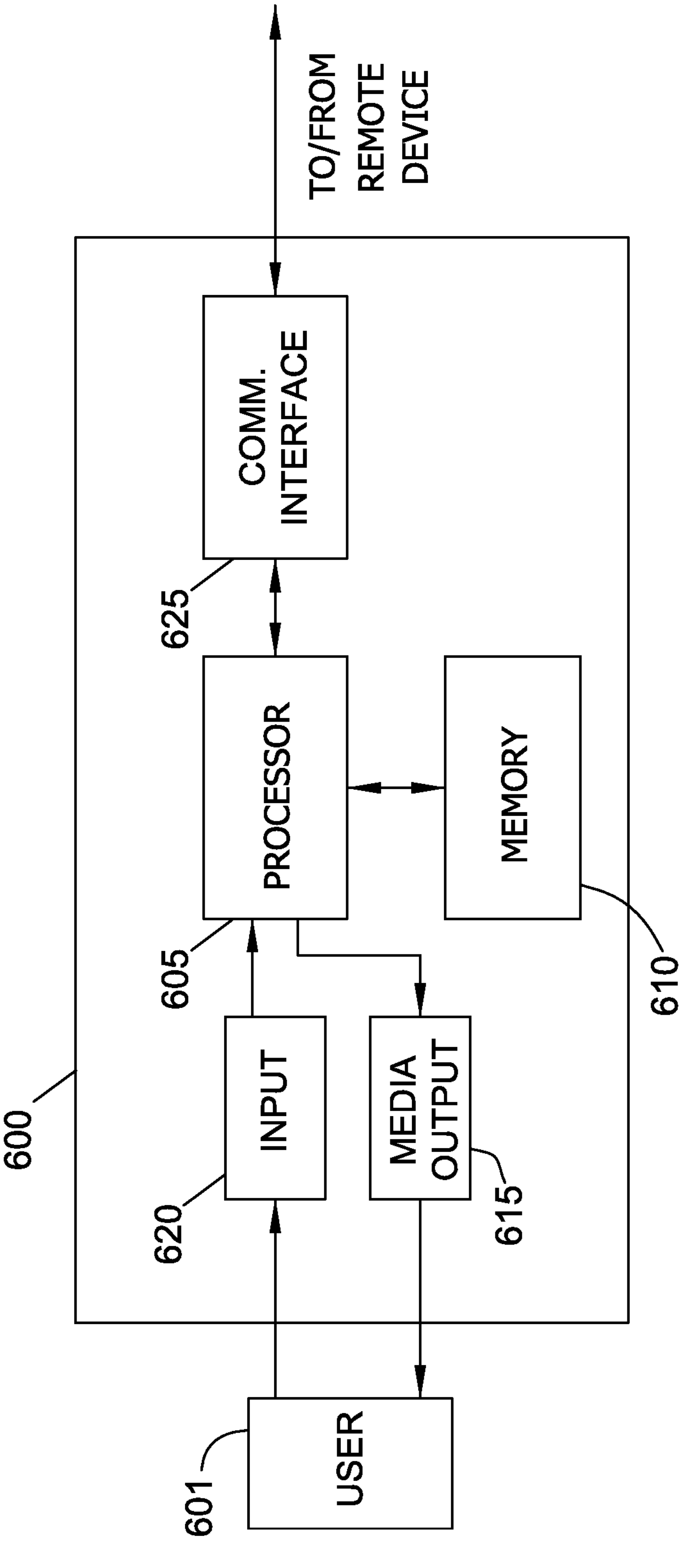
FIG. 6 depicts an exemplary configuration of a client computer device that may be used with the systems shown in FIGS. 1 and 2.

FIG. 6 depicts an exemplary configuration of a client computer device 600, such as user devices 140 shown in FIG. 1, in accordance with one embodiment of the present disclosure. User computer device 600 may be operated by a user 601. User computer device 600 may include, but is not limited to, devices 110, IoT camera 115, IoT thermostat 120, IoT door lock 125, user devices 140 (all shown in FIG. 1), EM devices 304, HVAC devices 314, home network computer devices 316, smart speaker devices 318, home entertainment devices 320, home security system 322, smart home system 324, and home power management system 326, home charging station 328 (all shown in FIG. 3). User computer device 600 may include a processor 605 for executing instructions. In some embodiments, executable instructions are stored in a memory area 610. Processor 605 may include one or more processing units (e.g., in a multi-core configuration). Memory area 610 may be any device allowing information such as executable instructions and/or transaction data to be stored and retrieved. Memory area 610 may include one or more computer readable media.

User computer device 600 may also include at least one media output component 615 for presenting information to user 601. Media output component 615 may be any component capable of conveying information to user 601. In some embodiments, media output component 615 may include an output adapter (not shown) such as a video adapter and/or an audio adapter. An output adapter may be operatively coupled to processor 605 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets), and/or voice or chat bots.

In some embodiments, media output component 615 may be configured to present a graphical user interface (e.g., a web browser and/or a client application) to user 601. A graphical user interface may include, for example, a host environment or guest environment of a software platform maintained by access control server 150 and executed on user computer device 600. In some embodiments, user computer device 600 may include an input device 620 for receiving input from user 601.

Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 600 may also include a communication interface 625, communicatively coupled to a remote device such as the access control server 150 (shown in FIG. 1) and/or the marketplace server 240 (shown in FIG. 2). Communication interface 625 may include, for example, a wired or wireless network adapter and/or a wireless data transceiver for use with a mobile telecommunications network.

Stored in memory area 610 are, for example, computer readable instructions for providing a user interface to user 601 via media output component 615 and, optionally, receiving and processing input from input device 620. A user interface may include, among other possibilities, a web browser and/or a client application. Web browsers enable users, such as user 601, to display and interact with media and other information typically embedded on a web page or a website from the access control server 150 and/or the marketplace server 240. A client application allows user 601 to interact with, for example, the access control server 150 and/or the marketplace server 240. For example, instructions may be stored by a cloud service, and the output of the execution of the instructions sent to the media output component 615.

Processor 605 executes computer-executable instructions for implementing aspects of the disclosure. In some embodiments, the processor 605 is transformed into a special purpose microprocessor by executing computer-executable instructions or by otherwise being programmed.

Exemplary Platform for Providing Host Environment and Guest Environment Using Access Control Server As described herein, access control server 150 provides a host environment to host users and a guest environment to guest users. These environments may be accessed as part of a property-sharing platform or in a separate platform associated with the overall system 100.

FIGS. 7-10 depict exemplary illustrative interfaces that may be encountered within the host environment, as described herein. For example, FIG. 7 depicts an interface 700 of a home screen or landing page. The host user may navigate between options on the home screen, such as reviewing upcoming stays, reading messages from guest users, viewing recommendations from the access control server 150, and reading reviews left by guest users and/or preparing reviews of guest users. The home screen also features at least one menu that the host user can use to navigate through different pages and features of the host environment. In the illustrative embodiment of interface 700, this menu includes options or tabs for a Home page, a Calendar page, and a Properties page. The Calendar page allows a host user to navigate through a calendar of past and upcoming stays at one or more properties. Selecting a stay from the calendar page may navigate the host user to a separate page or screen related to that particular stay. The Properties page enables a host user to view and update details related to the one or more properties within the host user's property portfolio, including upcoming (and/or past) stays for each property, the connected home devices at each property, the rental rates or other details for each property, and the like.

Figure 8:
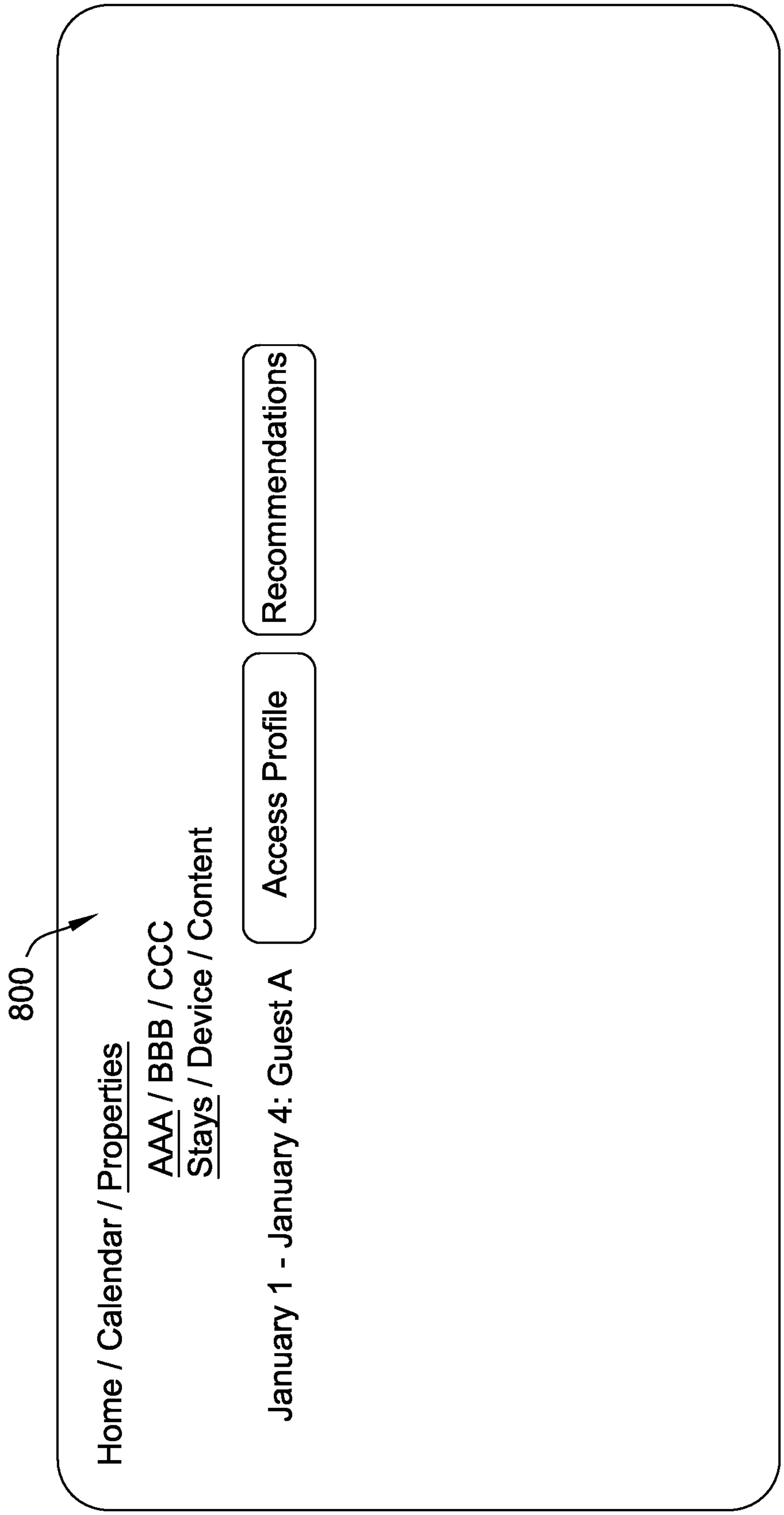

FIG. 8 depicts an interface 800 of a particular property page, where the host user has selected the Properties page, selected a particular property tab ("AAA"), and navigated to "Stays" page related thereto. The upcoming stays are listed, along with one or more selectable options related to the respective stay. In this example, the host user may select an "access profile" option, which would navigate the host user to a page at which the host user can view an edit the access profile for that stay. The host user may alternatively select a "recommendations" option, which would navigate the host user to a page at which the host user may view, accept, decline, or otherwise interact with recommendations for that stay that have been generated by the access control server 150 (e.g., the AI engine 230 thereof).

Figure 9:
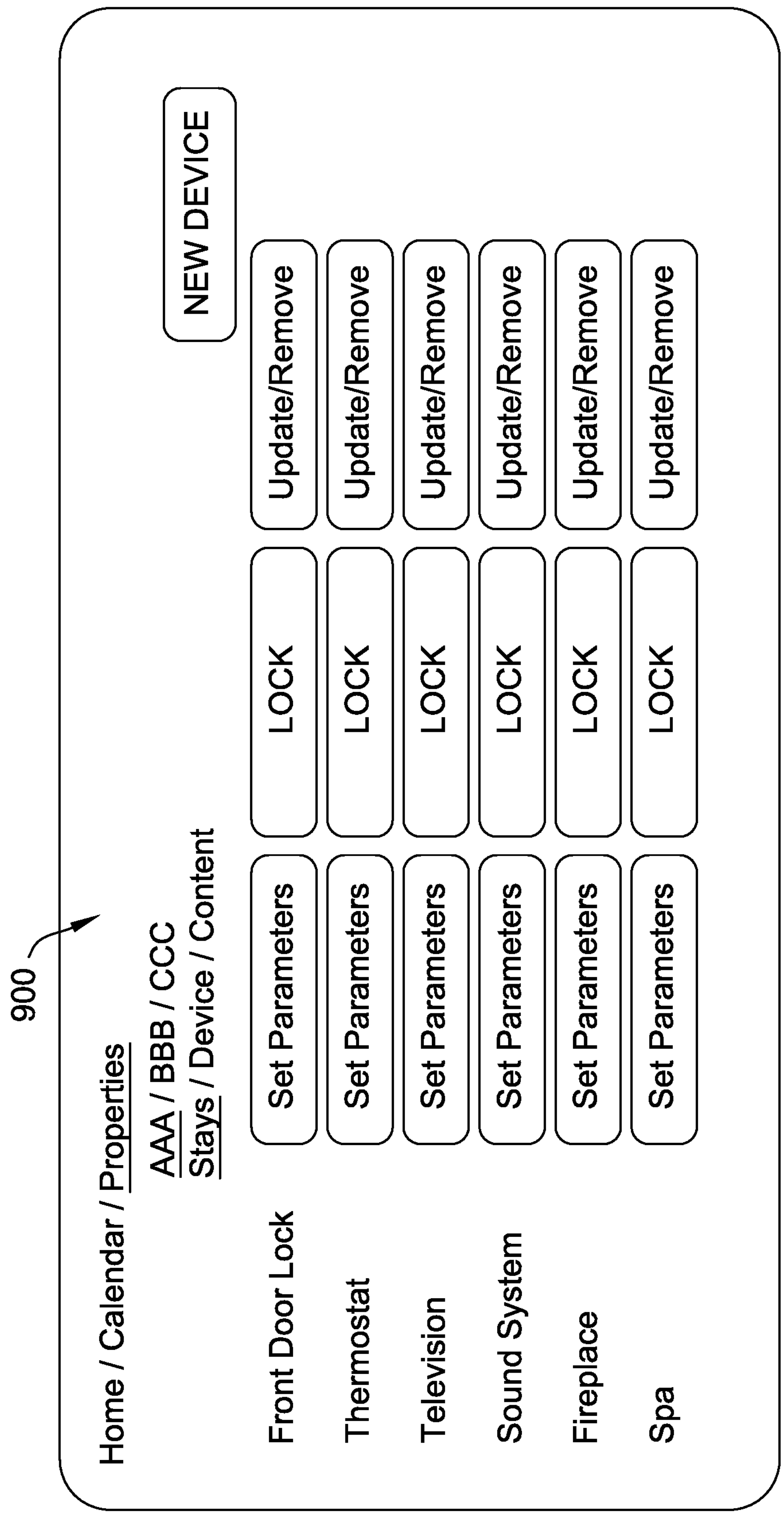

FIG. 9 depicts an interface 900 of a particular property page, where the host user has selected the Properties page, selected a particular property tab ("AAA"), and navigated to the "Devices" page related thereto. Each connected smart device associated with that particular property is listed. Various controls or selectable options are available for each device, including a "Set Parameters" option, a "LOCK" option, and an "Update/Remove" option. The "Set Parameters" option would, upon selection, navigate the host user to a page at which the host user can view the device definition and set, update, or modify the access parameters for any functionality or feature of the device. The "LOCK" option may be a simplified option that, upon selection, locks all features of the corresponding device such that the device cannot be accessed. The "Update/Remove" option may, upon selection by the host user, navigate the host user to a separate page where the host user can modify the device definition or remove the device from the property page. There is also an option to add a new device. Selection of this option enables the host user to manually add a connected device to the property page or initiate an automated process in which the access control server 150 identifies one or more new devices at the property.

Figure 10:
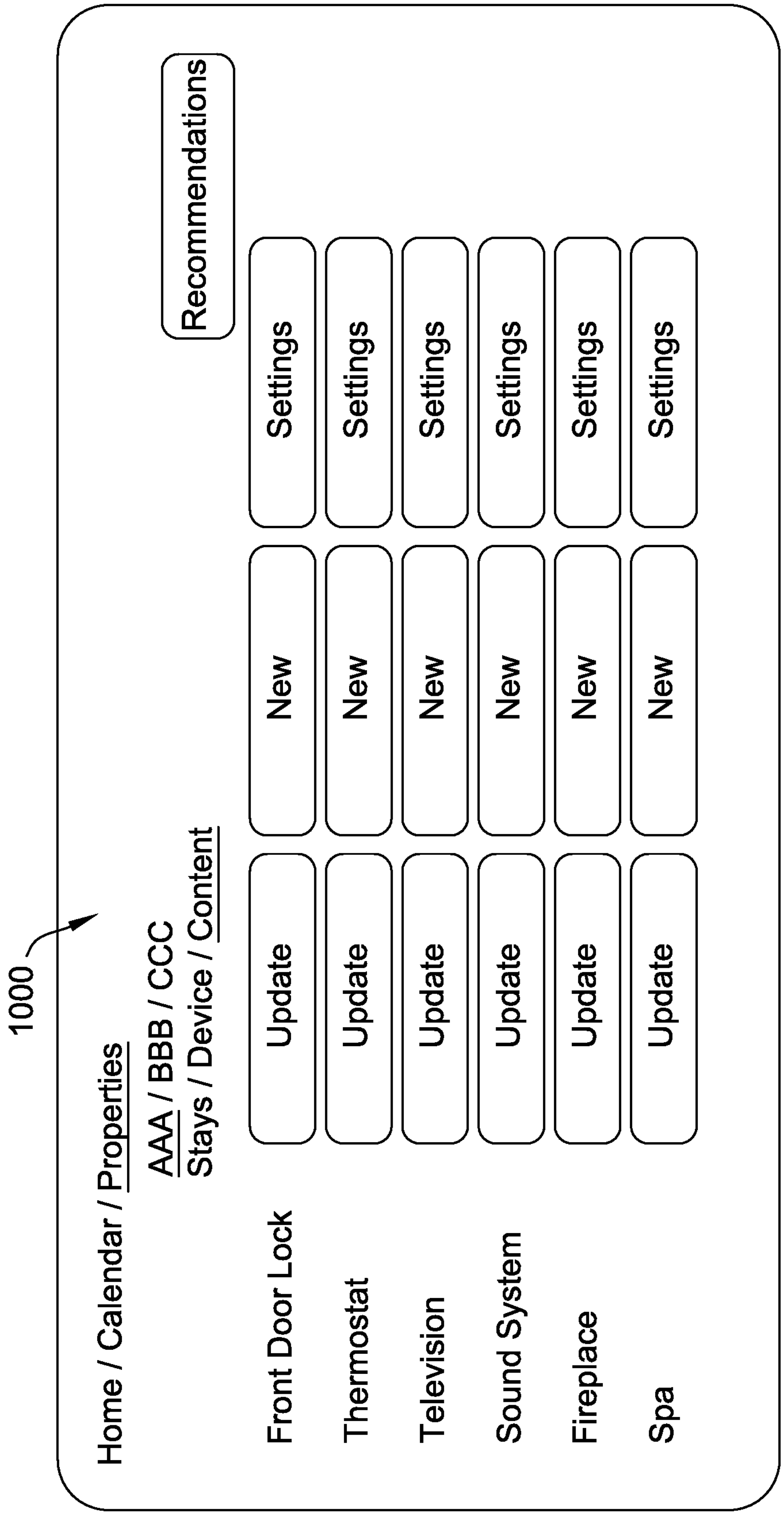

FIG. 10 depicts an exemplary interface 1000 of a particular property page, where the host user has selected the Properties page, selected a particular property tab ("AAA"), and navigated to a "Content" page related thereto. Here, the host user can review, add, modify, or delete content related to each connected device. The host user can view recommendations, generated by the access control server 150, related to the content available for each device. These recommendations may be related to the addition of content, the arrangement or accessibility of content, and the like.

Figure 12:
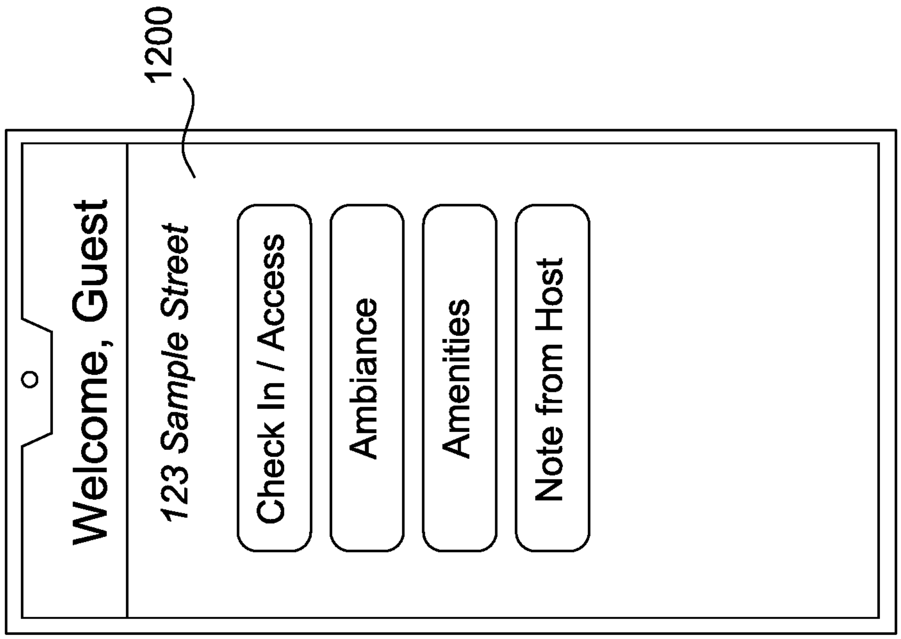
FIGS. 11-13 illustrate an exemplary guest user environment, including various exemplary user interfaces.
Figure 11:
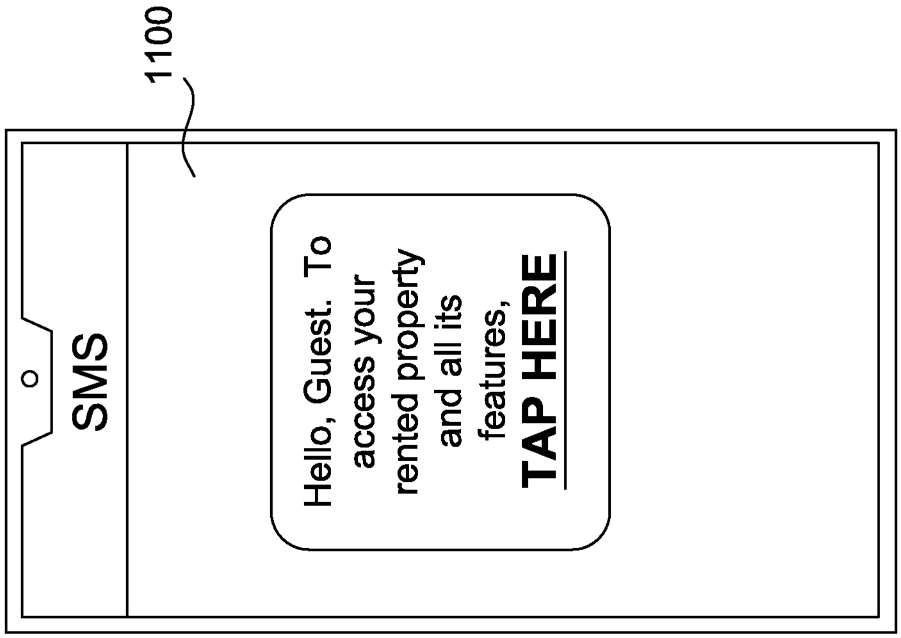
Figure 13:
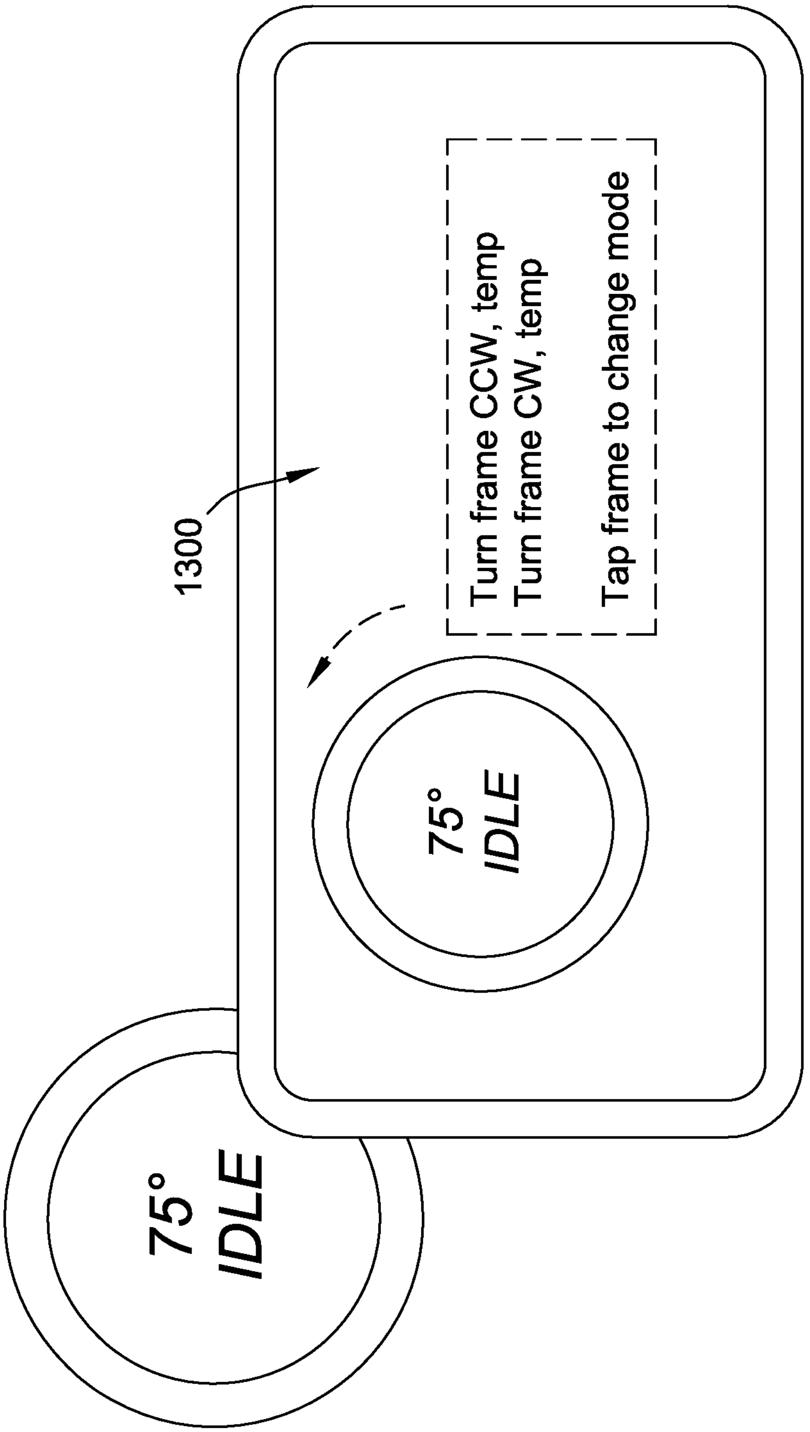

FIGS. 11-13 depict exemplary illustrative interfaces that may be encountered within the (defined, limited, or restricted) guest environment. More specifically, FIG. 11 depicts an exemplary interface 1100 that may enable the guest user to access the guest environment. An invitation message, illustrated as an SMS message, is transmitted to a user device of the guest user (e.g., a user device 140) and displayed to the guest user. The invitation message includes a customized link, as described herein, that, upon selection, provisions a limited guest environment to the guest user. The guest environment is limited based upon access parameters set by the host user, but may also be customized to the guest user based upon their own preferences and behavior.

FIG. 12 depicts an exemplary interface 1200 that may be displayed to the guest user upon selection of the customized link. The selectable options are defined or limited based upon the access parameters set by the host user but may be arranged based upon guest user preferences.

FIG. 13 depicts an exemplary interface 1300 within the guest environment, in which a guest user is accessing content associated with a connected home device, specifically, a smart thermostat. In this example, the guest user has activated an augmented reality feature, and is capturing live video of the smart thermostat. In response, the access control server 150 has initiated display of content associated with the smart thermostat. In particular, the content is displayed as an overlay over the live video and includes instructions for operation of the smart thermostat.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, access control server 150 is configured to implement machine learning, such that access control server 150 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of device data, captured by a variety of connected smart devices, and user data, related to a variety of host users and/or guest users, with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments, and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

Exemplary Embodiments

In one aspect, a computer system may be provided. The computer system may include a plurality of connected smart devices physically located within or near the property and communicatively coupled to a local communication network and a remote system server configured to communicate with the connected smart devices via an external communication network. The remote system server includes one or more processors programmed to (1) identify the connected smart devices within the property and a respective device definition for each connected smart device, the device definition representing functionality of the corresponding connected smart device; (2) generate a host environment for a host user, the host environment including a plurality of interactive user interfaces facilitating user input by the host user of access parameters limiting or defining access to each connected smart devices within the property for a duration of stay at the property by a guest user; (3) generate a guest environment for the guest user, the guest environment including a plurality of interactive user interfaces facilitating (i) display, to the guest user, of the access parameters of each connected smart device and (ii) defined control of each connected smart device according to the access parameters, for the duration of the stay at the property; and/or (4) enable defined control of each connected smart device within the property by the guest user, according to the access parameters. The system may have additional, less, or alternate functionality, including that discussed elsewhere herein.

In some aspects, the one or more processors of the remote system server are further programmed to identify the connected smart devices within or near the property by detecting the connected smart devices that are connected to a network interface device at the property.

In some aspects, the one or more processors of the remote system server are further programmed to identify the connected smart devices within the property by causing display of a user-fillable form with one or more fields on a display of a user computing device of the host user.

In further aspects, the one or more processors of the remote system server are further programmed to generate the host environment including a first user interface displaying a default access template to the host user, the default access template including default values for each access parameter for the property. In some such aspects, the one or more processors of the remote system server are further programmed to receive, via the host environment, user input from the host user including one or more modifications to the default access template. In some aspects, the one or more processors of the remote system server are further programmed to: (i) retrieve a guest profile associated with the guest user; and/or (ii) display a prompt, within the host environment, to the host user to modify one or more of the values of the access parameters of the default access template, based upon the guest profile.

In some aspects, the one or more processors of the remote system server are further programmed to automatically initiate control of the connected smart devices, according to the access parameters, based upon at least one of a time associated with the stay and a location of a user computing device of the guest user.

In still further aspects, the one or more processors of the remote system server are further programmed to automatically restrict access to the property at the end of the stay.

In some aspects, the one or more processors of the remote system server are further programmed to automatically restrict access to the property by reverting the connected smart devices to an unoccupied state based upon unoccupied access parameters.

In further aspects, the one or more processors of the remote system server are further programmed to: (i) generate an interactive link that, upon selection by the guest user, initiates generation of the guest environment; and/or (ii) transmit the interactive link to a user computing device of the guest user. In some such aspects, the one or more processors of the remote system server are further programmed to transmit the interactive link in response to a command from the host user within the host environment. In some aspects, the one or more processors of the remote system server are further programmed to automatically transmit the interactive link within a period of time preceding the stay.

In still further aspects, the one or more processors of the remote system server are further programmed to: (i) generate the guest environment including a first interactive user interface displaying a query option to the guest user; (ii) receive, via the guest environment, user input including a query from the guest user; and/or (iii) initiate, within the guest environment, a second interactive user interface including an automated chatbot programmed to display a response to the query.

In some aspects, the one or more processors of the remote system server are further programmed to: (i) communicate with a marketplace server to retrieve pricing and purchase information associated with at least one of the connected smart devices; and/or (ii) in response to a query from the guest user, within the guest environment, associated with the at least one connected smart device, display the pricing and purchase information within the guest environment.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system for controlling and provisioning access to a smart device associated with a property, the computer system comprising:

a plurality of connected smart devices physically located within or near the property and communicatively coupled to a local communication network; and a remote system server configured to communicate with the connected smart devices via an external communication network, the remote system server comprising one or more processors programmed to:

identify the connected smart devices within or near the property and a respective device definition for each connected smart device, the device definition representing functionality of the corresponding connected smart device;

generate a host environment for a host user, the host environment including a plurality of interactive user interfaces facilitating user input by the host user of access parameters limiting or defining access to each connected smart device within or near the property for a duration of stay at the property by a guest user;

generate a guest environment for the guest user for a limited period of time associated with the duration of the stay at the property, the guest environment being different from the host environment and including a plurality of interactive user interfaces facilitating (i) display, to the guest user, of the access parameters of each connected smart device and (ii) defined control of each connected smart device according to the access parameters, for the duration of the stay at the property;

in advance of the stay at the property, control each connected smart device in a default state, according to default access parameters from a default access template defined within the host environment; and enable the defined control, in response to input from the guest user within the guest environment, of each connected smart device within or near the property from the default state according to the access parameters, wherein the enabling of the defined control is automatically initiated, by the one or more processors, based upon a time associated with the stay at the property and a user computing device of the guest user reaching a threshold distance of the property.

2. The computer system of claim 1, wherein the one or more processors of the remote system server are further programmed to identify each of the connected smart devices that are within or near the property by detecting the connected smart devices that are connected to a network interface device local to the property and retrieving the corresponding device definitions via the network interface device.

3. The computer system of claim 1, wherein the one or more processors of the remote system server are further programmed to identify the connected smart devices within the property by causing display of a user-fillable form with one or more fields on a display of a user computing device of the host user.

4. The computer system of claim 1, wherein the one or more processors of the remote system server are further programmed to:

generate the host environment including a first user interface displaying the default access template to the host user, the default access template including default values for each access parameter for the property; and receive, via the host environment, user input from the host user including one or more modifications to the default access template.

5. The computer system of claim 1, wherein the one or more processors of the remote system server are further programmed to:

receive, via an Application Programming Interface (API) connection, a record defining the stay at the property, including the duration of the stay at the property.

6. The computer system of claim 4, wherein the one or more processors of the remote system server are further programmed to:

retrieve a guest profile associated with the guest user; and display a prompt, within the host environment, to the host user to modify one or more of the values of the access parameters of the default access template, based upon the guest profile.

7. The computer system of claim 6, wherein the one or more processors of the remote system server are further programmed to:

access information related to behavior of the guest user during one or more historical stays of the guest user at one or more properties; and apply machine learning techniques to the information to generate the guest profile associated with the guest user.

8. The computer system of claim 1, wherein the one or more processors of the remote system server are further programmed to:

automatically restrict access to the property at the end of the stay.

9. The computer system of claim 1, wherein the one or more processors of the remote system server are further programmed to:

define, based upon user input via the host environment, respective unoccupied access parameters for each of the connected smart devices, wherein at least one unoccupied access parameter is different from a respective default access parameter for a corresponding at least one of the connected smart devices; and automatically restrict access to the property by reverting the connected smart devices to the respective unoccupied access parameters.

10. The computer system of claim 1, wherein the one or more processors of the remote system server are further programmed to:

generate an interactive link that, upon selection by the guest user, initiates generation of the guest environment; and transmit the interactive link to a user computing device of the guest user.

11. The computer system of claim 10, wherein the one or more processors of the remote system server are further programmed to transmit the interactive link in response to a command from the host user within the host environment.

12. The computer system of claim 10, wherein the one or more processors of the remote system server are further programmed to:

identify the stay at the property is occurring within an upcoming period of time; and automatically transmit the interactive link within the period of time and preceding the stay.

13. The computer system of claim 1, wherein the one or more processors of the remote system server are further programmed to:

generate the guest environment including a first interactive user interface displaying a query option to the guest user;

receive, via the guest environment, user input including a query from the guest user; and initiate, within the guest environment, a second interactive user interface including an automated chatbot programmed to display a response to the query.

14. The computer system of claim 1, wherein the one or more processors of the remote system server are further programmed to:

communicate with a marketplace server to retrieve pricing and purchase information associated with at least one of the connected smart devices; and in response to a query from the guest user, within the guest environment, associated with the at least one connected smart device, display the pricing and purchase information within the guest environment.

15. A computer-implemented method for controlling and provisioning access to a smart device associated with a property, the property including a plurality of connected smart devices physically located within or near the property and communicatively coupled to a local communication network, the method implemented using a remote system server configured to communicate with the connected smart devices via an external communication network, the method comprising:

identifying the connected smart devices within or near the property and a respective device definition for each connected smart device, the device definition representing functionality of the corresponding connected smart device;

generating a host environment for a host user, the host environment including a plurality of interactive user interfaces facilitating user input by the host user of access parameters limiting or defining access to each connected smart device within or near the property for a duration of stay at the property by a guest user;

generating a guest environment for the guest user for a limited period of time associated with the duration of the stay at the property, the guest environment being different from the host environment and including a plurality of interactive user interfaces facilitating (i) display, to the guest user, of the access parameters of each connected smart device and (ii) defined control of each connected smart device according to the access parameters, for the duration of the stay at the property;

in advance of the stay at the property, controlling each connected smart device in a default state, according to default access parameters from a default access template defined within the host environment; and enabling the defined control, in response to input from the guest user within the guest environment, of each connected smart device within or near the property from the default state, according to the access parameters, comprising automatically initiating the enabling of the defined control of each connected smart device based upon a time associated with the stay at the property and a user computing device of the guest user reaching a threshold distance of the property.

16. The computer-implemented method of claim 15, wherein identifying the connected smart devices comprises at least one of:

detecting the connected smart devices that are connected to a network interface device local to the property; and causing display of a user-fillable form with one or more fields on a display of a user computing device of the host user.

17. The computer-implemented method of claim 15, further comprising:

generating the host environment including a first user interface displaying the default access template to the host user, the default access template including default values for each access parameter for the property; and receiving, via the host environment, user input from the host user including one or more modifications to the default access template.

18. The computer-implemented method of claim 15, further comprising receiving, via an Application Programming Interface (API) connection, a record defining the stay at the property, including the duration of the stay at the property.

19. The computer-implemented method of claim 15, further comprising:

accessing information related to behavior of the guest user during one or more historical stays of the guest user at one or more properties;

applying machine learning techniques to the information to generate the guest profile associated with the guest user;

retrieving the guest profile; and displaying a prompt, within the host environment, to the host user to modify one or more of the values of the access parameters of the default access template, based upon the guest profile.

20. At least one non-transitory computer-readable storage medium storing thereon computer-executable instructions for controlling and provisioning access to a smart device associated with a property, the property including a plurality of connected smart devices physically located within or near the property and communicatively coupled to a local communication network, wherein when executed by at least one processor of a remote system server configured to communicate with the connected smart devices via an external communication network, the computer-executable instructions cause the at least one processor to:

identify the connected smart devices within or near the property and a respective device definition for each connected smart device, the device definition representing functionality of the corresponding connected smart device;

generate a host environment for a host user, the host environment including a plurality of interactive user interfaces facilitating user input by the host user of access parameters limiting or defining access to each connected smart device within or near the property for a duration of stay at the property by a guest user;

generate a guest environment for the guest user for a limited period of time associated with the duration of the stay at the property, the guest environment being different from the host environment and including a plurality of interactive user interfaces facilitating (i) display, to the guest user, of the access parameters of each connected smart device and (ii) defined control of each connected smart device according to the access parameters, for the duration of the stay at the property;

in advance of the stay at the property, control each connected smart device in a default state, according to default access parameters from a default access template defined within the host environment; and enable the defined control, in response to input from the guest user within the guest environment, of each connected smart device within or near the property from the default state according to the access parameters, wherein the enabling of the defined control is automatically initiated, by the at least one processor, based upon a time associated with the stay at the property and a user computing device of the guest user reaching a threshold distance of the property.

* * * * *